US012749454B2

(12) United States Patent
Park et al.

(10) Patent No.: US 12,749,454 B2
(45) Date of Patent: Sep. 29, 2026

(54) DISPLAY APPARATUS AND ELECTRONIC APPARATUS INCLUDING THE SAME

(71) Applicant: Samsung Display Co., LTD., Yongin-si (KR)

(72) Inventors: Junhyun Park, Yongin-si (KR); Youngwan Seo, Yongin-si (KR); Soil Yoon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/079,328

(22) Filed: Mar. 13, 2025

(65) Prior Publication Data

US 2025/0336366 A1 Oct. 30, 2025

(30) Foreign Application Priority Data

Apr. 30, 2024 (KR) ........................ 10-2024-0057608

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0842* (2013.01); *G09G 2310/0286* (2013.01); *G09G 2310/06* (2013.01); *G09G 2320/0233* (2013.01); *G09G 2330/023* (2013.01); *G09G 2360/14* (2013.01)

(58) Field of Classification Search
None
See application file for complete search history.

(56) References Cited

U.S. PATENT DOCUMENTS 11,996,054 B2 5/2024 Kang et al.
2018/0012550 A1* 1/2018 Lim .................... G09G 3/3225
2018/0190200 A1* 7/2018 Xiao .................... H10D 86/60
2019/0347997 A1* 11/2019 Park .................... G11C 19/28
2021/0193048 A1* 6/2021 Lim .................... G09G 3/3266
2021/0366354 A1* 11/2021 Li .................... G09G 3/007
(Continued)

FOREIGN PATENT DOCUMENTS

CN 117409697 A 1/2024
KR 1020200023563 A 3/2020
(Continued)

*Primary Examiner* — Dorothy Harris
(74) *Attorney, Agent, or Firm* — CANTOR COLBURN LLP

(57) ABSTRACT

A display apparatus includes a pixel, a gate driver and a data driver. The gate driver includes: an applying transistor applying a previous carry signal to a transmitter in response to a clock signal; the transmitter applying the previous carry signal to a pull-down control node; a pull-up controller connected to the transmitter and controlling a pull-up control node; a pull-down transistor applying a low voltage to an output node in response to a pull-down control node voltage; a pull-up transistor applying a high voltage to the output node in response to a pull-up control node voltage; a carry pull-down transistor applying a carry low voltage to a carry node in response to the pull-up control node voltage; and a carry pull-up transistor applying a carry high voltage to the carry node in response to the pull-up control node voltage. The carry low voltage is higher than the low voltage.

20 Claims, 12 Drawing Sheets

(56) References Cited

U.S. PATENT DOCUMENTS

| | | | | |
|---|---|---|---|---|
| 2023/0113452 A1* | 4/2023 | Kim | ..................... | G09G 3/3266 |
| | | | | 345/691 |
| 2023/0177999 A1* | 6/2023 | Park | ..................... | G09G 3/2096 |

FOREIGN PATENT DOCUMENTS

| | | | |
|---|---|---|---|
| KR | 1020200061448 | A | 6/2020 |
| KR | 1020210047436 | A | 4/2021 |
| KR | 1020240010635 | A | 1/2024 |

* cited by examiner

DISPLAY APPARATUS AND ELECTRONIC APPARATUS INCLUDING THE SAME

This application claims priority to Korean Patent Application No. 10-2024-0057608, filed on Apr. 30, 2024, and all the benefits accruing therefrom under 35 U.S.C. § 119, the content of which in its entirety is herein incorporated by reference.

BACKGROUND

1. Field

Embodiments of the present invention relate to a display apparatus and an electronic apparatus. More particularly, embodiments of the present invention relate to a display apparatus which a power consumption is reduced and an electronic apparatus including the same.

2. Description of the Related Art

Generally, a display apparatus includes a display panel and a display panel driver. The display panel includes a plurality of gate lines, a plurality of data lines, a plurality of emission lines and a plurality of pixels. The display panel driver includes a gate driver providing a gate signal to the gate lines, a data driver providing a data voltage to the data lines, an emission driver providing an emission signal to the emission lines and a driving controller controlling the gate driver, the data driver and the emission driver.

Generally, according to a voltage range applied to a gate driver, a power consumption may be increased.

SUMMARY

Embodiments of the present invention provide a display apparatus which a power consumption is reduced.

Embodiments of the present invention also provide an electronic apparatus which a power consumption is reduced.

According to embodiments, a display apparatus includes: a display panel including a pixel, a gate driver configured to output a gate signal to the pixel and a data driver configured to apply a data voltage to the pixel. The gate driver may include an applying transistor configured to apply a previous carry signal to a transmitter in response to a clock signal, the transmitter configured to apply the previous carry signal to a pull-down control node, a pull-up controller connected to the transmitter and configured to control a pull-up control node, a pull-down transistor configured to apply a first low voltage to an output node in response to a voltage of the pull-down control node, a pull-up transistor configured to apply a high voltage to the output node in response to a voltage of the pull-up control node, a carry pull-down transistor configured to apply a carry low voltage to a carry node in response to the voltage of the pull-up control node and a carry pull-up transistor configured to apply a carry high voltage to the carry node in response to the voltage of the pull-up control node. The carry low voltage may be higher than the first low voltage.

In an embodiment, the carry pull-down transistor may be an N-type transistor, and the carry pull-up transistor may be a P-type transistor.

In an embodiment, the transmitter may include a first transmit transistor configured to connect a first node and a second node and a second transmit transistor configured to connect the second node and the pull-down control node.

In an embodiment, the first transmit transistor may include a control electrode for receiving the carry high voltage, a first electrode connected to the first node and a second electrode connected to the second node.

In an embodiment, the second transmit transistor may include a control electrode for receiving the first low voltage, a first electrode connected to the second node and a second electrode connected to the pull-down control node.

In an embodiment, the first transmit transistor may be an N-type transistor.

In an embodiment, the second transmit transistor may include a control electrode for receiving the first low voltage, a first electrode connected to the second node and a second electrode connected to the pull-down control node.

In an embodiment, the pull-up controller may include a first pull-up control transistor including a control electrode connected to the pull-down control node, a first electrode for receiving the first low voltage and a second electrode connected to the pull-up control node and a second pull-up control transistor including a control electrode connected to the pull-down control node, a first electrode for receiving the high voltage and a second electrode connected to the pull-up control node.

In an embodiment, a difference between the first low voltage and the carry low voltage may be higher than an absolute value of a threshold voltage of the carry pull-down transistor.

In an embodiment, the gate driver may include a first transistor including a control electrode for receiving the clock signal, a first electrode for receiving the previous carry signal and a second electrode connected a first node, a second transistor including a control electrode for receiving the first low voltage, a first electrode connected to a second node and a second electrode connected to the pull-down control node, a third transistor including a control electrode connected to the pull-down control node, a first electrode for receiving the first low voltage and a second electrode connected to the pull-up control node, a fourth transistor including a control electrode connected to the pull-down control node, a first electrode for receiving the high voltage and a second electrode connected to the pull-up control node, a fifth transistor including a control electrode connected to the pull-down control node, a first electrode for receiving the first low voltage and a second electrode connected to the output node, a sixth transistor including a control electrode connected to the pull-up control node, a first electrode for receiving the high voltage and a second electrode connected to the output node, a seventh transistor including a control electrode connected to the pull-up control node, a first electrode for receiving the carry low voltage and a second electrode connected to the carry node, an eighth transistor including a control electrode connected to the pull-up control node, a first electrode for receiving the carry high voltage and a second electrode connected to the carry node and a ninth transistor including a control electrode for receiving the carry high voltage, a first electrode connected to the first node and a second electrode connected to the second node. The first transistor may be the applying transistor, the fifth transistor may be the pull-down transistor, the sixth transistor may be the pull-up transistor, the seventh transistor may be the carry pull-down transistor, and the eighth transistor may be the carry pull-up transistor.

According to embodiments, a display apparatus includes a display panel including a pixel, a gate driver configured to output a gate signal to the pixel and a data driver configured to apply a data voltage to the pixel. The gate driver may include an applying transistor configured to apply a previous carry signal to a transmitter in response to a clock signal, the transmitter configured to apply the previous carry signal to the pull-down control node, a pull-up controller connected to the transmitter and configured to control a pull-up control node, a pull-down transistor configured to apply a first low voltage to an output node in response to a voltage of the pull-down control node, a pull-up transistor configured to apply a high voltage to the output node in response to a voltage of the pull-up control node, a carry pull-down transistor configured to apply a carry low voltage to a carry node in response to the voltage of the pull-down control node and a carry pull-up transistor configured to apply a carry high voltage to the carry node in response to the voltage of the pull-up control node. The carry low voltage may be higher than the first low voltage.

In an embodiment, the carry pull-down transistor may be a P-type transistor.

In an embodiment, the transmitter may include a first transmit transistor configured to connect a first node and a second node and a second transmit transistor configured to connect the second node and the pull-down control node.

In an embodiment, the first transmit transistor may include a control electrode for receiving the carry high voltage, a first electrode connected to the first node and a second electrode connected to the second node.

In an embodiment, the first transmit transistor may be an N-type transistor.

In an embodiment, the second transmit transistor may include a control electrode for receiving a second low voltage different from the first low voltage, a first electrode connected to the second node and a second electrode connected to the pull-down control node.

In an embodiment, a difference between the first low voltage and the carry low voltage may be higher than an absolute value of a threshold voltage of the carry pull-down transistor.

According to embodiments, an electronic apparatus includes a display panel including a pixel, a gate driver configured to output a gate signal to the pixel, a data driver configured to apply a data voltage to the pixel, a driving controller configured to control the gate driver and the data driver and a processor configured to output input image data and input control signal. The gate driver may include an applying transistor configured to apply a previous carry signal to a transmitter in response to a clock signal, the transmitter configured to apply the previous carry signal to a pull-down control node, a pull-up controller connected to the transmitter and configured to control a pull-up control node, a pull-down transistor configured to apply a first low voltage to an output node in response to a voltage of the pull-down control node, a pull-up transistor configured to apply a high voltage to the output node in response to a voltage of the pull-up control node, a carry pull-down transistor configured to apply a carry low voltage to a carry node in response to the voltage of the pull-up control node and a carry pull-up transistor configured to apply a carry high voltage to the carry node in response to the voltage of the pull-up control node. The carry low voltage may be higher than the first low voltage.

In an embodiment, the carry pull-down transistor may be an N-type transistor, and the carry pull-up transistor may be a P-type transistor.

In an embodiment, a difference between the first low voltage and the carry low voltage may be higher than an absolute value of a threshold voltage of the carry pull-down transistor.

As described above, according to the display apparatus and the electronic apparatus including the same, the carry low voltage is higher than the first low voltage and the carry high voltage is lower than the high voltage. Since the carry low voltage is higher than the first low voltage and the carry high voltage is lower than the high voltage, a power consumption of the display apparatus may be effectively reduced.

Additionally, the carry pull-down transistor is an N-type transistor. Accordingly, an output stability of the gate signal may be effectively improved. Additionally, a slew rate of the gate signal may be effectively improved. Additionally, an on-off duty ratio of a gate signal of a previous stage, a gate signal of a present stage and a gate signal of a next stage may be substantially the same.

BRIEF DESCRIPTION OF THE DRAWINGS

Illustrative, non-limiting embodiments will be more clearly understood from the following detailed description in conjunction with the accompanying drawings.

DETAILED DESCRIPTION

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/ or components, but do not preclude the presence or addition of one or more other features, regions, integers, steps, operations, elements, components, and/or groups thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Hereinafter, the present invention will be explained in detail with reference to the accompanying drawings.

Figure 1:
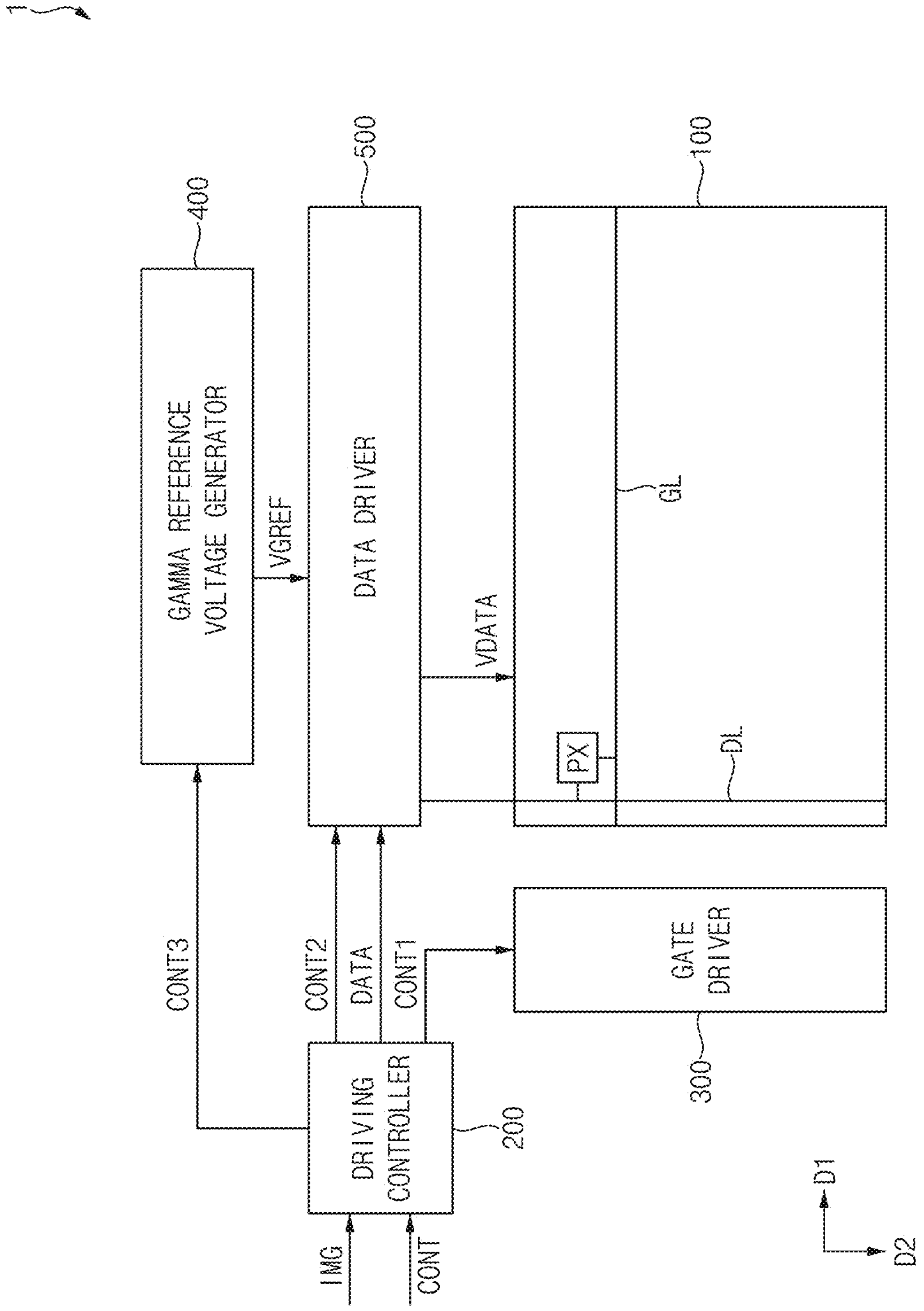
FIG. 1 is a block diagram illustrating a display apparatus according to embodiments of the present invention.

FIG. 1 is a block diagram illustrating a display apparatus 1 according to embodiments of the present invention.

Referring to FIG. 1, the display apparatus 1 includes a display panel 100 and a display panel driver. The display panel driver includes a driving controller 200, a gate driver 300, a gamma reference voltage generator 400 and a data driver 500.

The display panel 100 has a display region on which an image is displayed and a peripheral region adjacent to the display region.

The display panel 100 includes a plurality of gate lines GL, a plurality of data lines DL and a plurality of pixels electrically connected to the gate lines GL and the data lines DL. The gate lines GL may extend in a first direction D1 and the data lines DL may extend in a second direction D2 crossing the first direction D1.

The driving controller 200 receives input image data IMG and an input control signal CONT from an external apparatus. For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT and outputs the third control signal CONT3 to the gamma reference voltage generator 400.

The gate driver 300 generates gate signals driving the gate lines GL in response to the first control signal CONT1 received from the driving controller 200. The gate driver 300 may output the gate signals to the gate lines GL.

In an embodiment, the gate driver 300 may be disposed in the peripheral region. In an embodiment, the gate driver 300 may be integrated in the peripheral region.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages VDATA having an analog type using the gamma reference voltages VGREF. The data driver 500 outputs the data voltages VDATA to the data lines DL.

In an embodiment, the data driver 500 may be disposed in the peripheral region. In an embodiment, the data driver 500 may be integrated in the peripheral region.

Figure 2:
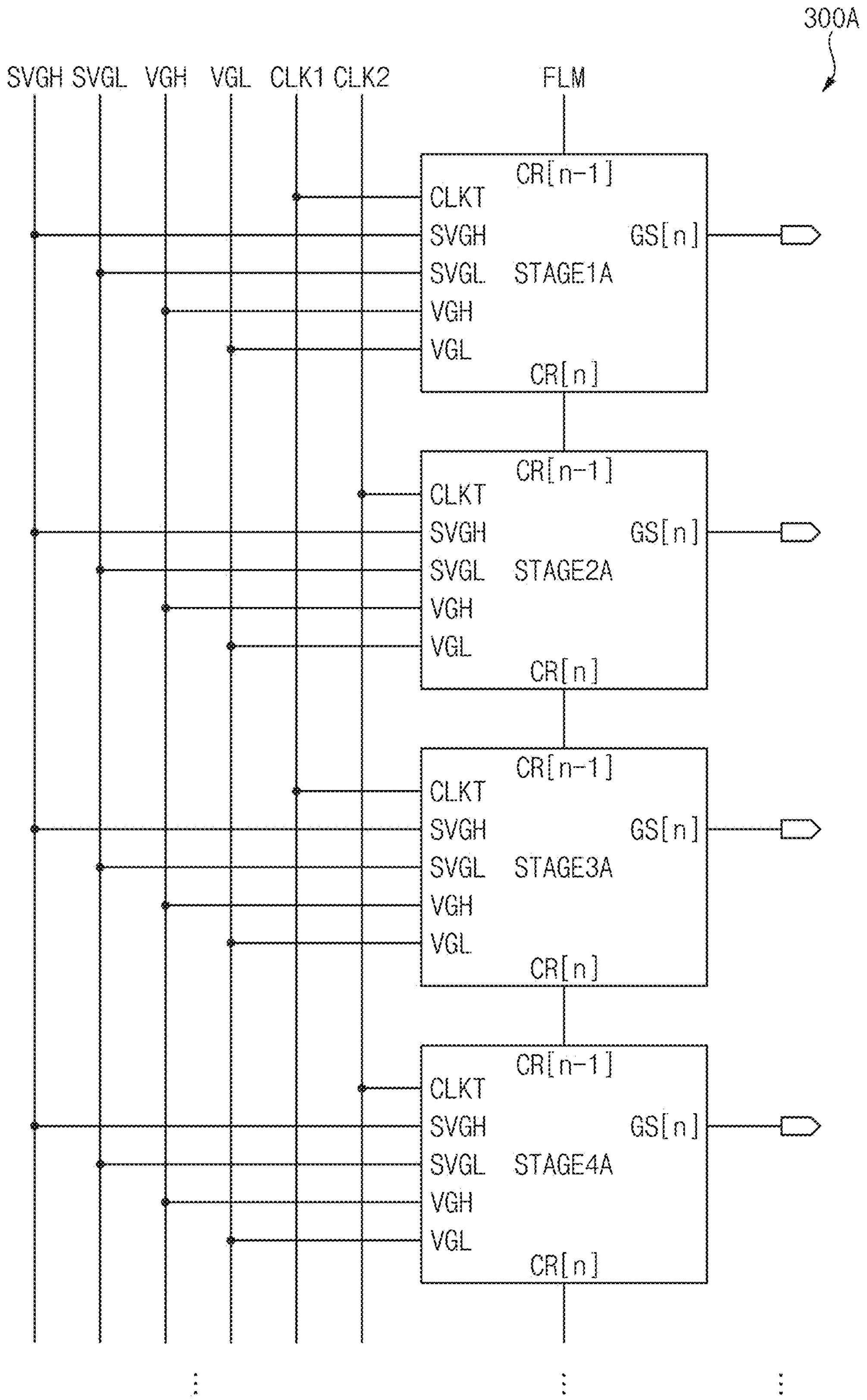
FIG. 2 is a block diagram illustrating an example of a gate driver included in a display apparatus of FIG. 1.

FIG. 2 is a block diagram illustrating an example of a gate driver 300 included in a display apparatus 1 of FIG. 1.

Referring to FIG. 1 and FIG. 2, the display apparatus 1 may include a gate driver 300A.

The gate driver 300A may include a plurality of stages STAGE1A, STAGE2A, STAGE3A, STAGE4A, . . . .

The stages STAGE1A, STAGE2A, STAGE3A, STAGE4A, . . . may receive a vertical start signal FLM, a first clock signal CLK1 and a second clock signal CLK2. The stages STAGE1A, STAGE2A, STAGE3A, STAGE4A, . . . may sequentially output gate signals GS[1], GS[2], GS[3], GS[4], . . . to the pixel circuit PX row by row. For example, the stages STAGE1A, STAGE2A, STAGE3A, STAGE4A, . . . may receive a previous carry signal CR[n−1]. The previous carry signal CR[n−1] may be a carry signal CR[n] of a previous stage. The previous carry signal CR[n−1] of the first stage STAGE1A may be the vertical start signal FLM.

The first clock signal CLK1 may be applied to a clock terminal CLKT of the first stage STAGE1A. The second clock signal CLK2 may be applied to a clock terminal CLKT of the second stage STAGE2A. Same as, the first clock signal CLK1 may be applied to a clock terminal CLKT of the third stage STAGE3A. The second clock signal CLK2 may be applied to a clock terminal CLKT of the fourth stage STAGE4A.

The stages STAGE1A, STAGE2A, STAGE3A, STAGE4A, . . . may receive a high voltage VGH, a first low volage VGL, a carry high voltage SVGH and a carry low voltage SVGL. The carry high voltage SVGH may be higher than the first low voltage VGL. For example, the first low voltage VGL may be called as an "output low voltage".

For example, the carry signal CR[n] may have the carry high voltage SVGH or the carry low voltage SVGL.

Figure 3:
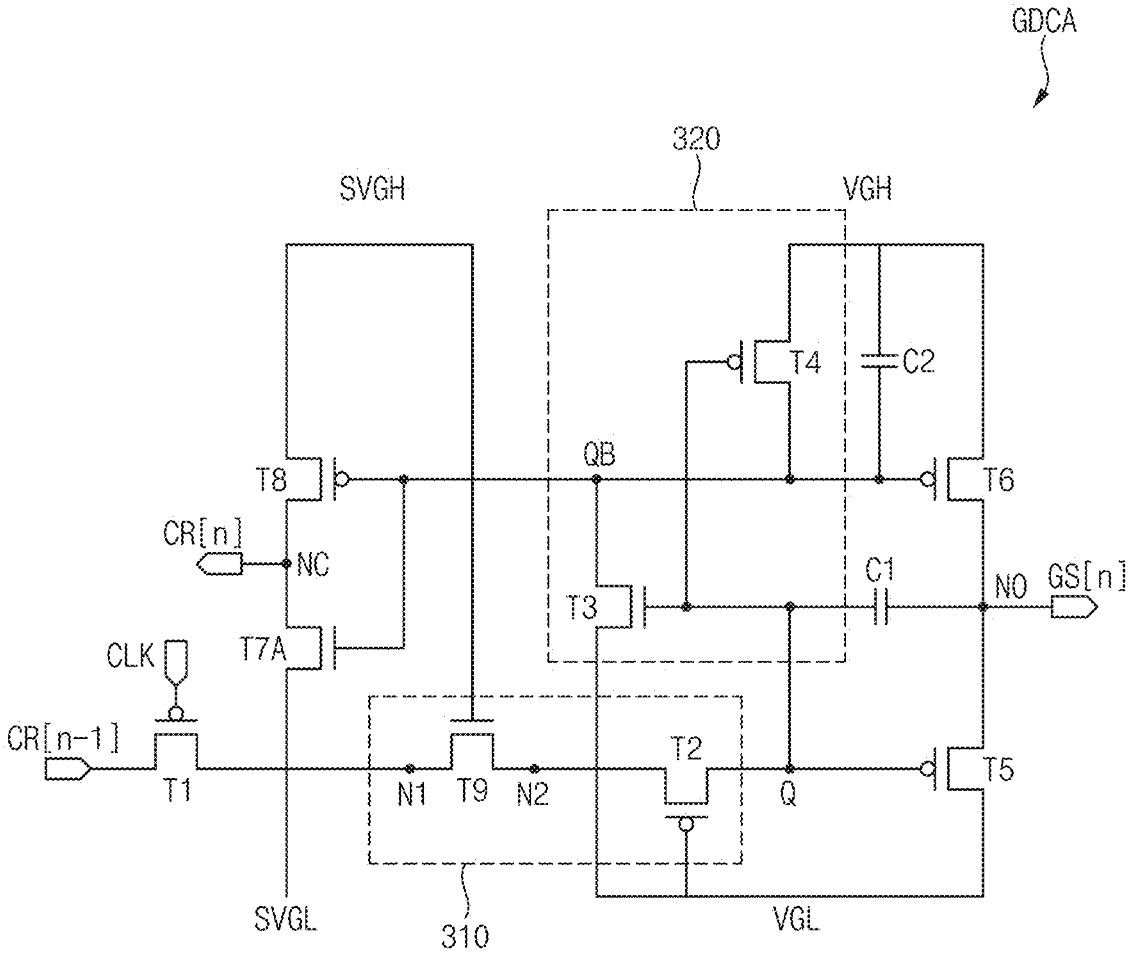
FIG. 3 is a circuit diagram illustrating a gate driving circuit included in a gate driver of FIG. 2.

FIG. 3 is a circuit diagram illustrating a gate driving circuit GDCA included in a gate driver 300A of FIG. 2.

Referring to FIG. 1 to FIG. 3, the gate driving circuit GDCA may include a first transistor T1, a second transistor T2, a third transistor T3, a fourth transistor T4, a fifth transistor T5, a sixth transistor T6, a seventh transistor T7, an eighth transistor T8, a ninth transistor T9, a first capacitor C1 and a second capacitor C2. The gate driving circuit GDCA may include a transmitter 310 and a pull-up controller 320. The transmitter 310 may include the second transistor T2 and the ninth transistor T9. The pull-up controller 320 may include the third transistor T3 and the fourth transistor T4.

The transmitter 310 may apply the previous carry signal CR[n−1] to the pull-down control node Q.

The pull-up controller 320 may control a pull-up control node QB in response to a voltage of the pull-down control node Q. For example, the pull-up controller 320 may apply the first low voltage VGL to the pull-up control node QB in response to the voltage of the pull-down control node Q. For example, the pull-up controller 320 may apply the high voltage VGH to the pull-up control node QB in response to the voltage of the pull-down control node Q.

The first transistor T1 may include a control electrode for receiving a clock signal CLK, a first electrode for receiving the previous carry signal CR[n−1] and a second electrode connected to a first node N1. The first transistor T1 may apply the previous carry signal CR[n−1] to the first node N1 in response to the clock signal CLK. For example, the first transistor T1 may be called as an “applying transistor”.

The second transistor T2 may include a control electrode for receiving the first low voltage VGL, a first electrode connected to a second node N2 and a second electrode connected to the pull-down control node Q. The second transistor T2 may connect the second node N2 and the pull-down control node Q in response to the first low voltage VGL. For example, the first electrode of the second transistor T2 may be a source electrode. For example, the second transistor T2 may be called as a “second transmit transistor”.

The third transistor T3 may include a control electrode connected to the pull-down control node Q, a first electrode for receiving the first low voltage VGL and a second electrode connected to the pull-up control node QB. The third transistor T3 may apply the first low voltage VGL to the pull-up control node QB in response to a voltage of the pull-down control node Q. For example, the third transistor T3 may be called as a “first pull-up control transistor”.

The fourth transistor T4 may include a control electrode connected to a pull-down control node Q, a first electrode for receiving the first low voltage VGL and a second electrode connected to an output node NO. For example, the fourth transistor T4 may be called as a “second pull-up control transistor”.

The fifth transistor T5 may apply the first low voltage VGL to the output node NO in response to the voltage of the pull-down control node Q. For example, the fifth transistor T5 may be called as a “pull-down transistor”.

The sixth transistor T6 may include a control electrode connected to the pull-up control node QB, a first electrode for receiving the high voltage VGH and a second electrode connected to the output node NO. The sixth transistor T6 may apply the high voltage VGH to the output node NO in response to a voltage of the pull-up control node QB. For example, the sixth transistor T6 may be called as a “pull-up transistor”.

The seventh transistor T7A may include a control electrode connected to the pull-up control node QB, a first electrode for receiving the carry low voltage SVGL and a second electrode connected to a carry node NC. The seventh transistor T7A may apply the carry low voltage SVGL to the carry node NC in response to the voltage of the pull-up control node QB. For example, the seventh transistor T7A may be called as a “carry pull-down transistor”.

The eighth transistor T8 may include a control electrode connected to the pull-up control node QB, a first electrode for receiving the carry high voltage SVGH and a second electrode connected to the carry node NC. The eighth transistor T8 may apply the carry high voltage SVGH to the carry node NC in response to the voltage of the pull-up control node QB. For example, the eighth transistor T8 may be called as a “carry pull-up transistor”.

The ninth transistor T9 may include a control electrode connected to the pull-up control node QB, a first electrode for receiving the carry high voltage SVGH and a second electrode connected to the carry node NC. The ninth transistor T9 may connect the first node N1 and the second node N2 in response to the carry high voltage SVGH. For example, the ninth transistor T9 may be called as a “first transmit transistor”. In the present embodiment, the ninth transistor T9 may be an N-type transistor. For example, the first electrode of the ninth transistor T9 may be a source electrode.

The first capacitor C1 may include a first electrode connected to the output node NO and a second electrode connected to pull-down control node Q. The first capacitor C1 may be bootstrapping a change of a voltage of the output node NO and output a bootstrapping voltage to the pull-down control node Q.

The second capacitor C2 may include a first electrode for receiving the high voltage and a second electrode connected to the pull-up control node QB.

The gate driving circuit GDCA may output a voltage of the output node NO as the gate signal GS[n]. The gate driving circuit GDCA may output a voltage of the carry node NC as the carry signal CR[n].

In the present embodiment, the carry low voltage SVGL may be higher than the first low voltage VGL and the carry high voltage SVGH may be lower than the high voltage VGH. Since the carry low voltage SVGL may be higher than the first low voltage VGL and the carry high voltage SVGH may be lower than the high voltage VGH, a power consumption of the gate driver may be effectively reduced.

A difference between the carry low voltage SVGL and the first low voltage VGL may be higher than an absolute value of a threshold voltage of the seventh transistor T7A. Accordingly, when the first low voltage VGL is applied to the pull-up control node QB, the seventh transistor T7A may be turned-off.

In the present embodiment, the third transistor T3 may be an N-type transistor. Since the third transistor T3 may be an N-type transistor, the first low voltage VGL may be applied to the pull-up control node QB stably. For example, since the third transistor T3 may be an N-type transistor, the first low voltage VGL may be applied to the pull-up control node QB without attenuation equal to a threshold voltage of the third transistor T3.

In the present embodiment, the seventh transistor T7A may be an N-type transistor. Since the seventh transistor T7A may be an N-type transistor, the carry low voltage SVGL may be applied to the carry node NC stably. For example, since the seventh transistor T7A may be an N-type transistor, the carry low voltage SVGL may be applied to the carry node NC without attenuation equal to a threshold voltage of the seventh transistor T7A. Accordingly, a stability of the carry signal CR[n] may be effectively improved. For example, a carry low level the carry signal CR[n] may be substantially the same as the carry low voltage SVGL. Accordingly, a previous carry low level of the previous carry signal CR[n−1] may be substantially the same as the carry low voltage SVGL. Since the previous carry low level of the previous carry signal CR[n−1] may be substantially the same as the carry low voltage SVGL, a voltage applied to the pull-down control node Q may be substantially the same as the carry low voltage SVGL. Accordingly, when the first capacitor C1 bootstraps a voltage of the output node NO to the pull-down control node Q, the fifth transistor T5 may be turned on stably. For example, the fifth transistor T5 may be turned on strongly. Since the fifth transistor T5 may be turned on stably, the first low voltage VGL may be applied to the output node NO stably. Accordingly, an output stability of the gate signal GS[n] may be effectively improved. Additionally, a slew rate of the gate signal GS[n] may be effectively improved. Additionally, an on-off duty ratio of a gate signal of a previous stage, a gate signal of a present stage and a gate signal of a next stage may be substantially the same.

Figure 4:
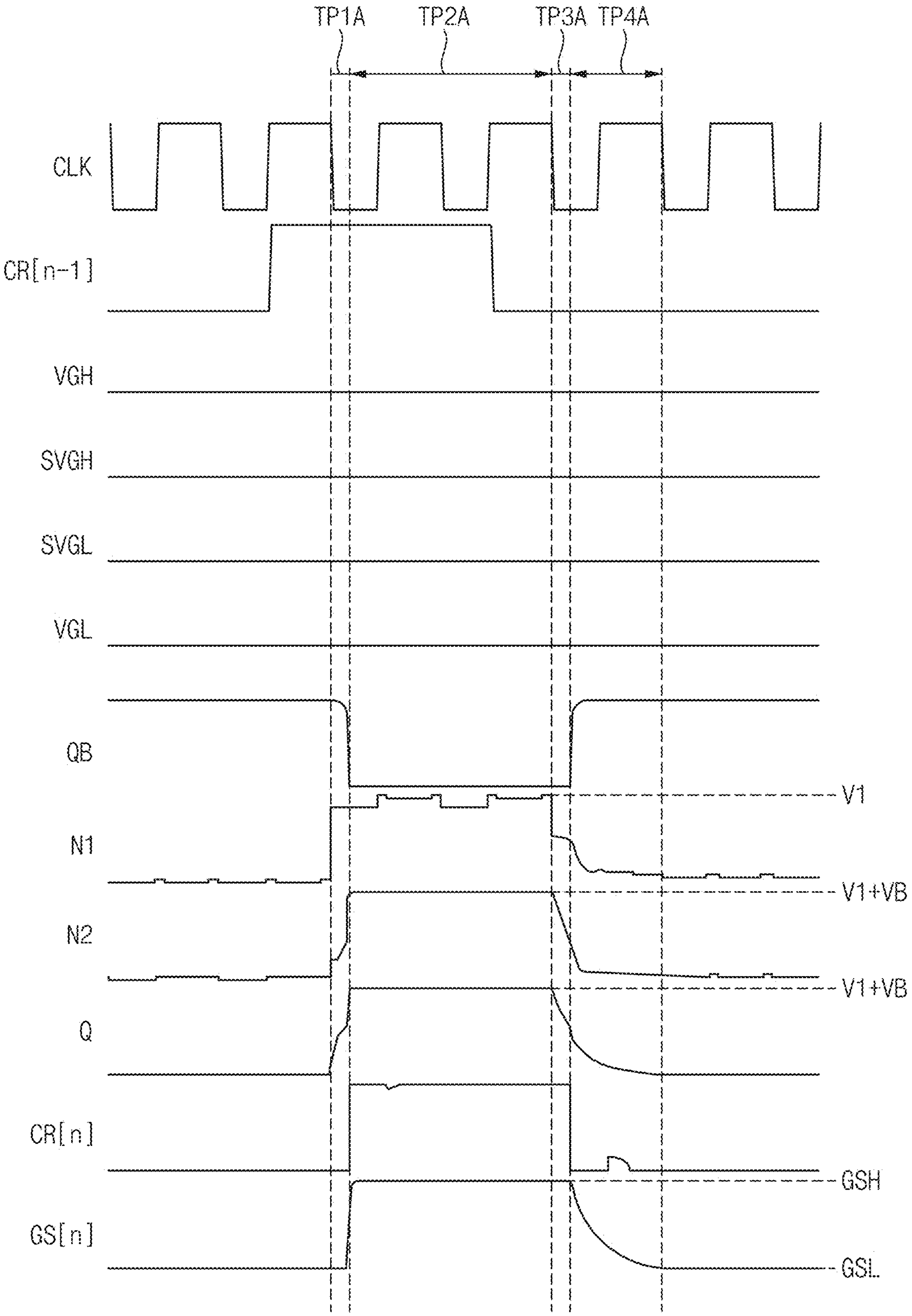
FIG. 4 is a timing diagram illustrating input signals, output signals and node voltages of a gate driving circuit of FIG. 3.

FIG. 4 is a timing diagram illustrating input signals, output signals and node voltages of a gate driving circuit GDCA of FIG. 3.

Referring to FIG. 3 and FIG. 4, a period which the gate driving circuit GDCA is driven may include first to fourth periods TP1A, TP2A, TP3A and TP4A.

In the first period TPIA, the previous carry signal CR[n−1] may have the carry high voltage SVGH and the clock signal CLK may have a clock low level. The first transistor T1 may be turned-on in response to the clock low level. Accordingly, the previous carry signal CR[n−1] may be applied to the first node N1. The ninth transistor T9 may be turned-on in response to the carry high voltage SVGH. Since the ninth transistor T9 may be turned-on, the previous carry signal CR[n−1] may be applied to the second node N2. The second transistor T2 may be turned-on in response to the first low voltage VGL. Since the second transistor T2 may be turned-on, the previous carry signal CR[n−1] may be applied to the pull-down control node Q. In the first period TP1A, the pull-down control node Q may have the carry high level. The third transistor T3 may be turned-on in response to a voltage of the pull-down control node Q. Since the third transistor T3 may be turned-on, the first low voltage VGL may be applied to the pull-down control node Q. Additionally, the fourth transistor T4 may be turned-off in response to a voltage of the pull-down control node Q. The sixth transistor T6 may be turned-on in response to a voltage of the pull-up control node QB. Since the sixth transistor T6 may be turned-on, the high voltage VGH may be applied to the output node NO. Accordingly, the gate signal GS[n] may have a gate high level GSH. Additionally, the eighth transistor T8 may be turned-on in response to a voltage of the pull-up control node QB and the seventh transistor T7A may be turned-off in response to voltage of the pull-up control node QB. Since the eighth transistor T8 may be turned-on and the seventh transistor T7A may be turned-off, the carry high voltage SVGH may be applied to the carry node NC. Accordingly, the carry signal CR[n] may have the carry high voltage SVGH.

In the second period TP2A, since the carry high voltage SVGH may be applied to the second node N2, a difference between a voltage of the control node of the ninth transistor T9 and a voltage of the first node N1 may be substantially the same as a threshold voltage of the ninth transistor T9. Since the difference between the voltage of the control node of the ninth transistor T9 and the voltage of the first node N1 may be substantially the same as the threshold voltage of the ninth transistor T9, the ninth transistor T9 may be turned-off. Since the ninth transistor T9 may be turned-off, the second node N2 may be floated.

In the second period TP2A, since the second node N2 may be floated, the first capacitor C1 may bootstrap a change of a voltage of the output node NO to the pull-down control node Q. For example, in the second period TP2A, a voltage of the output node NO may be changed from the first low voltage VGL to the high voltage VGH. The first capacitor C1 may apply a difference between the first low voltage VGL and the high voltage VGH to the pull-down control node Q. Accordingly, the pull-down control node Q may have a bootstrapping voltage V1+VB. The fifth transistor T5 may be turned-off strongly in response to the bootstrapping voltage V1+VB.

In the third period TP3A, the previous carry signal CR[n−1] may have the carry low voltage SVGL and the clock signal CLK may have the clock low level. Accordingly, the first transistor T1 may be turned-on. Since the first transistor T1 may be turned-on, the carry low voltage SVGL may be applied to the first node N1. Since the carry low voltage SVGL may be applied to the first node N1, a difference between a voltage of the first node N1 and the voltage of the control electrode of the ninth transistor T9 may be higher than the absolute value of the threshold voltage of the ninth transistor T9. Accordingly, the ninth transistor T9 may be turned-on. Since the ninth transistor T9 may be turned-on, the carry low voltage SVGL may be applied to the pull-down control node Q. Since the carry low voltage SVGL may be applied to the pull-down control node Q, the fifth transistor T5 may be turned-on. The third transistor T3 may be turned-off in response to a voltage of the pull-down control node Q. The fourth transistor T4 may be turned-on in response to the voltage of the pull-down control node Q. Since the fourth transistor T4 may be turned-on, the high voltage VGH may be applied to the pull-up control node QB. The sixth transistor T6 may be turned-off in response to a voltage of the pull-up control node QB. Since the fifth transistor T5 may be turned-on, the first low voltage VGL may be applied to the output node NO. Accordingly, the gate signal GS[n] may have a gate low level GSL. Additionally, in response to a voltage of the pull-up control node QB, the eighth transistor T8 may be turned-off and the seventh transistor T7 may be turned-on. Since the eighth transistor T8 may be turned-off and the seventh transistor T7 may be turned-on, the carry low voltage SVGL may be applied to the carry node NC. Accordingly, the carry signal CR[n] may have a carry low voltage SVGL.

In the fourth period TP4A, the clock signal CLK may have the clock high level. The first transistor T1 may be turned-off in response to the clock signal CLK. Additionally, since the carry low voltage SVGL may be applied to the second node N2, a difference between a voltage of the control electrode of the second transistor T2 and a voltage of the second node N2 may be lower than an absolute value of a threshold voltage of the second transistor T2. Accordingly, the second transistor T2 may be turned-off. Since the second transistor T2 may be turned-off, the pull-down control node Q may be floated. Since the pull-down control node Q may be floated, the first capacitor may bootstrap a change of a voltage of the output node NO to the pull-down control node Q. For example, in the fourth period TP4A, the output node NO may be changed from the high voltage VGH to the first low voltage VGL. The first capacitor may apply a difference between the first low voltage VGL and the high voltage VGH to the pull-down control node Q. Accordingly, a voltage of the pull-down control node Q may be lower than the carry low voltage SVGL. Accordingly, the fifth transistor T5 may be turned-on strongly. Since the fifth transistor T5 may be turned-on strongly, an output stability of the gate signal GS[n] may be effectively improved.

Figure 5:
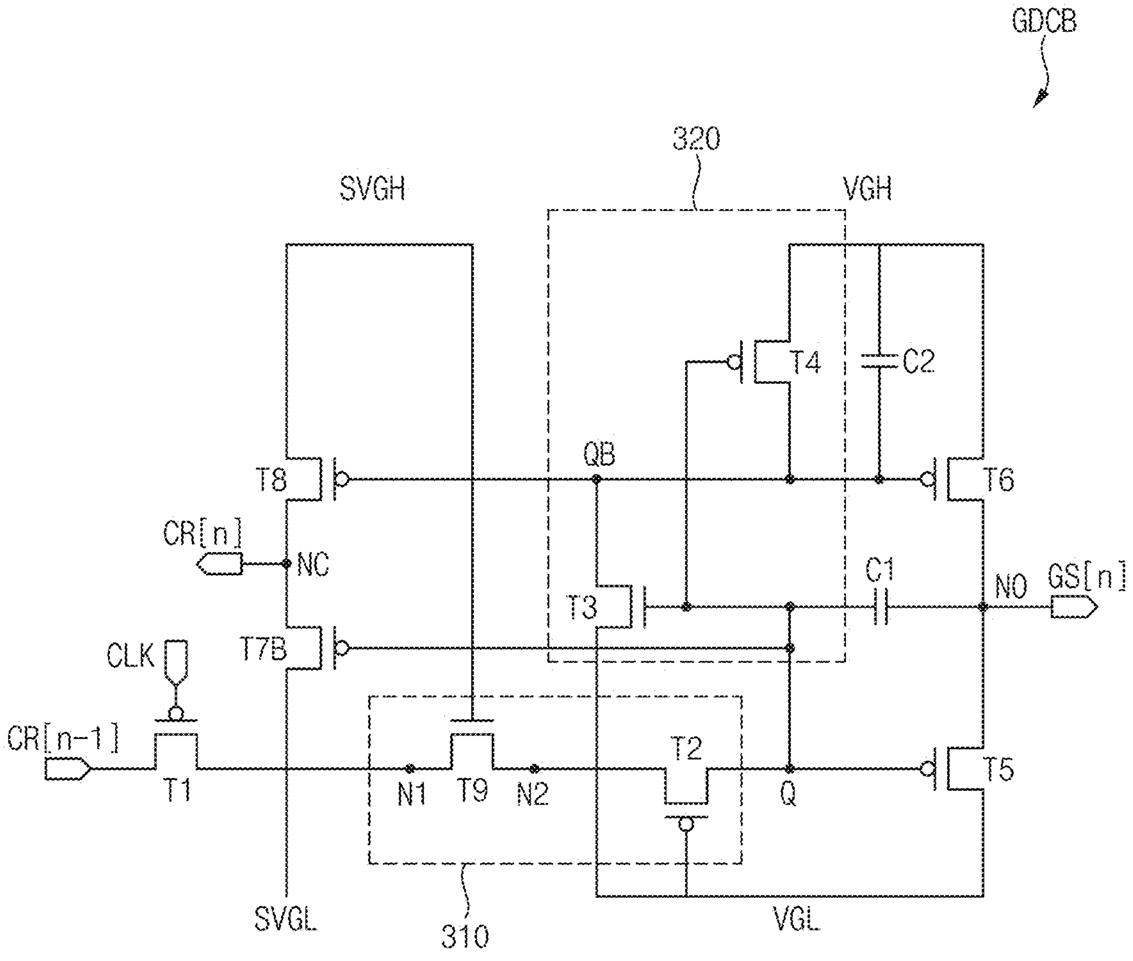
FIG. 5 is a circuit diagram illustrating a gate driving circuit included in a gate driver of FIG. 2.

FIG. 5 is a circuit diagram illustrating a gate driving circuit GDCB included in a gate driver 300A of FIG. 2.

Referring to FIG. 5, a gate driving circuit GDCB may include first to ninth transistor T1, T2, T3, T4, T5, T6, T7B, T8 and T9, a first capacitor C1 and a second capacitor C2.

The gate driving circuit GDCB according to a present embodiment is substantially the same as the gate driving circuit GDCA in FIG. 3 except that the seventh transistor T7B is a P-type transistor and a control electrode of the seventh transistor T7B is connected to the pull-down control node Q. Accordingly, the same reference numerals will be used to refer to the same and any repetitive explanation concerning the above elements will be omitted.

In the present embodiment, the carry low voltage SVGL applied to the gate driving circuit GDCB may be higher than the first low voltage VGL and the carry high voltage SVGH may be lower than the high voltage VGH. Since the carry low voltage SVGL may be higher than the first low voltage VGL and the carry high voltage SVGH may be lower than the high voltage VGH, a power consumption of the gate driving circuit GDCB may be effectively reduced.

Figure 6:
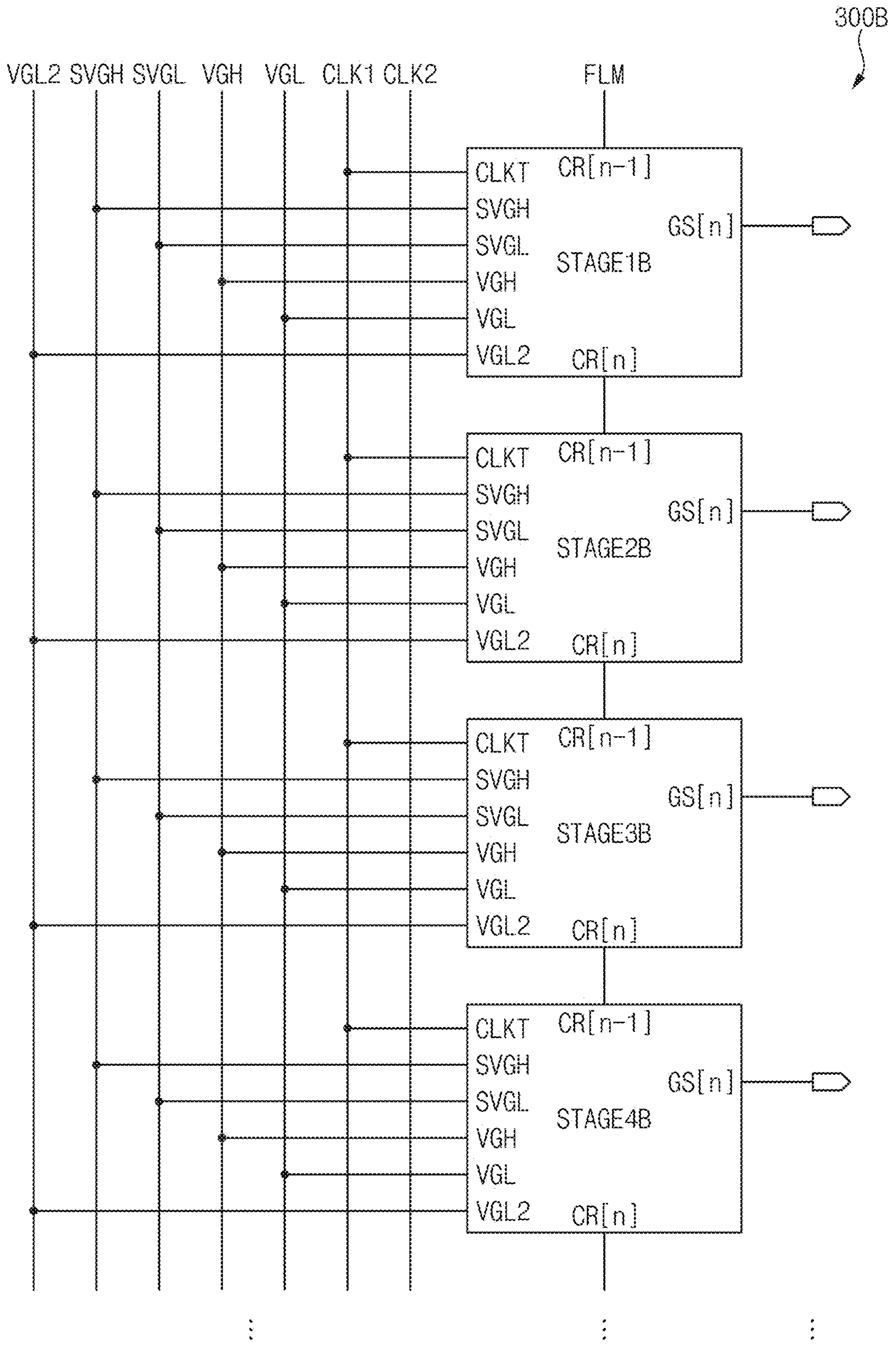
FIG. 6 is a block diagram illustrating an example of a gate driver included in a display apparatus of FIG. 1.

FIG. 6 is a block diagram illustrating an example of a gate driver 300 included in a display apparatus 1 of FIG. 1.

Referring to FIG. 1 and FIG. 6, the display apparatus 1 may include a gate driver 300B. The gate driver 300B may include a plurality of stages STAGE1B, STAGE2B, STAGE3B, STAGE4B, . . . .

The stages STAGE1B, STAGE2B, STAGE3B, STAGE4B, . . . may receive a vertical start signal FLM, a first clock signal CLK1 and a second clock signal CLK2. The stages STAGE1B, STAGE2B, STAGE3B, STAGE4B, . . . may sequentially output gate signals GS[1], GS[2], GS[3], GS[4], . . . to the pixel circuit PX row by row. For example, the stages STAGE1B, STAGE2B, STAGE3B, STAGE4B, . . . may receive a previous carry signal CR[n−1]. The previous carry signal CR[n−1] may be a carry signal CR[n] of a previous stage. The previous carry signal CR[n−1] of the first stage STAGE1B may be the vertical start signal FLM.

The first clock signal CLK1 may be applied to a clock terminal CLKT of the first stage STAGE1B. The second clock signal CLK2 may be applied to a clock terminal CLKT of the second stage STAGE2B. Same as, the first clock signal CLK1 may be applied to a clock terminal CLKT of the third stage STAGE3B. The second clock signal CLK2 may be applied to a clock terminal CLKT of the fourth stage STAGE4B.

The stages STAGE1B, STAGE2B, STAGE3B, STAGE4B, . . . may receive a high voltage VGH, a first low volage VGL, a second low voltage VGL2 different from the first low voltage VGL, a carry high voltage SVGH and a carry low voltage SVGL. The carry high voltage SVGH may be lower than the high voltage VGH. The carry low voltage SVGL may be higher than the first low voltage VGL.

For example, the carry signal CR[n] may have the carry high voltage SVGH or the carry low voltage SVGL. For example, the gate signal GS[n] may have the high voltage VGH or the first low voltage VGL.

Figure 7:
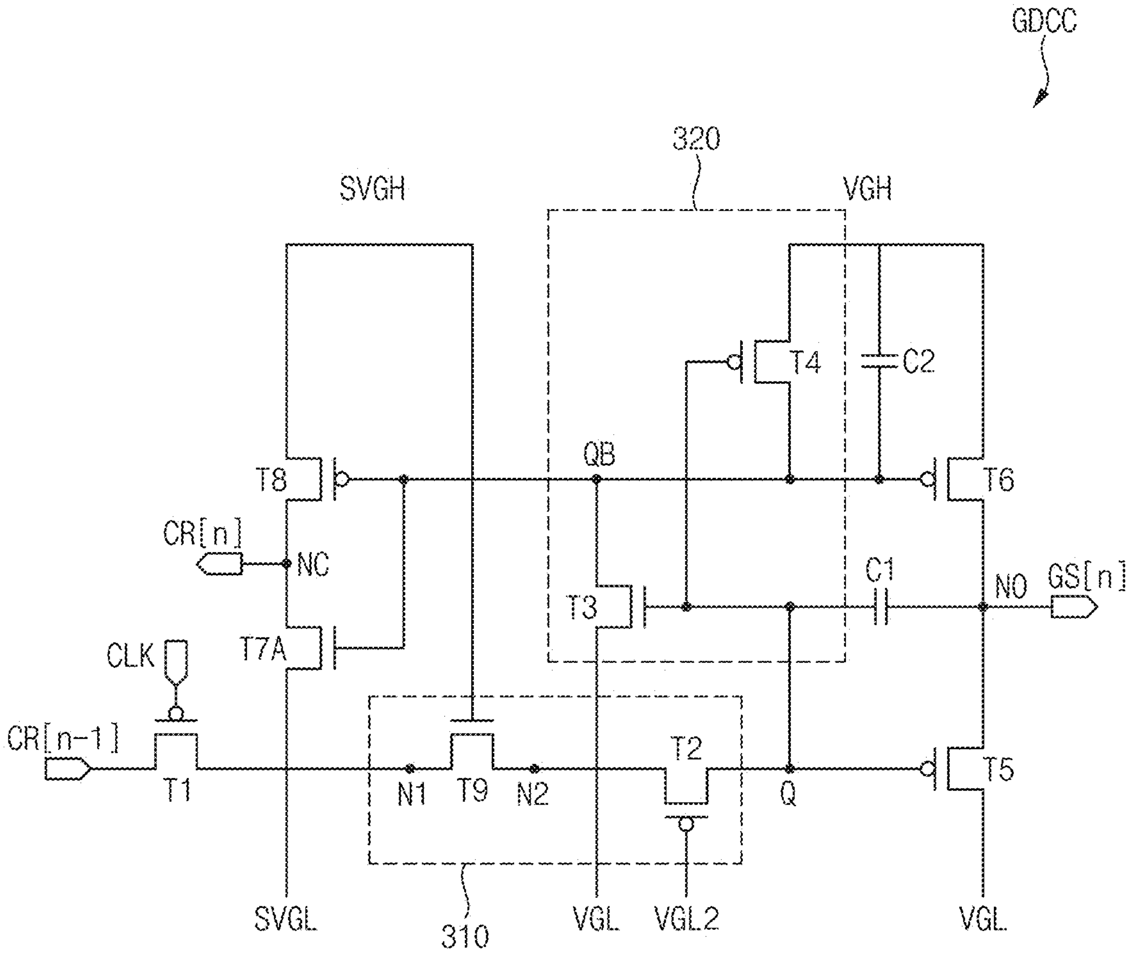
FIG. 7 is a circuit diagram illustrating a gate driving circuit included in a gate driver of FIG. 2.

FIG. 7 is a circuit diagram illustrating a gate driving circuit GDCC included in a gate driver 300B of FIG. 2.

Referring to FIG. 7, a gate driving circuit GDCC may include first to ninth transistor T1, T2, T3, T4, T5, T6, T7A, T8 and T9, a first capacitor C1 and a second capacitor C2.

The gate driving circuit GDCC according to a present embodiment is substantially the same as the gate driving circuit GDCA except that the second low voltage VGL2 may be applied to a control electrode of the second transistor T2. Accordingly, the same reference numerals will be used to refer to the same and any repetitive explanation concerning the above elements will be omitted.

Referring to FIG. 1, FIG. 4, FIG. 6 and FIG. 7, the second low voltage VGL2 may be applied to the control electrode of the second transistor T2. The first low voltage VGL and the second low voltage VGL2 may be different. A voltage of the pull-down control node Q may be controlled based on the second low voltage VGL2. For example, in the fourth period TP4A, a timing which the second transistor T2 is turned-off may be controlled based on a difference between the second low voltage VGL2 and a voltage of the second node N2.

When the second low voltage VGL2 is higher than the first low voltage VGL, the timing which the second transistor T2 may be faster. Since the timing which the second transistor T2 may be faster, a timing which the pull-down control node Q is floated may be faster. Accordingly, the bootstrapping voltage applied to the pull-down control node Q may be increased. Accordingly, the fifth transistor T5 may be turned-on more strongly. Additionally, since the timing which the pull-down control node Q is floated may be faster, a timing which the fourth transistor T4 is turned-on may be faster. Accordingly, a timing which the seventh transistor T7A is turned-on may be faster. Since the timing which the seventh transistor T7A is turned-on may be faster, a slew rate of the carry signal CR[n] may be effectively improved.

When the second low voltage VGL2 is lower than the first low voltage VGL, a timing which the second transistor T2 is turned-off may be delayed. Since the timing which the second transistor T2 is turned-off may be delayed, the timing which the pull-down control node Q is floated may be delayed. Accordingly, the bootstrapping voltage applied to the pull-down control node Q may be reduced. Accordingly, a stress applied to the fifth transistor T5 may be reduced.

Figure 8:
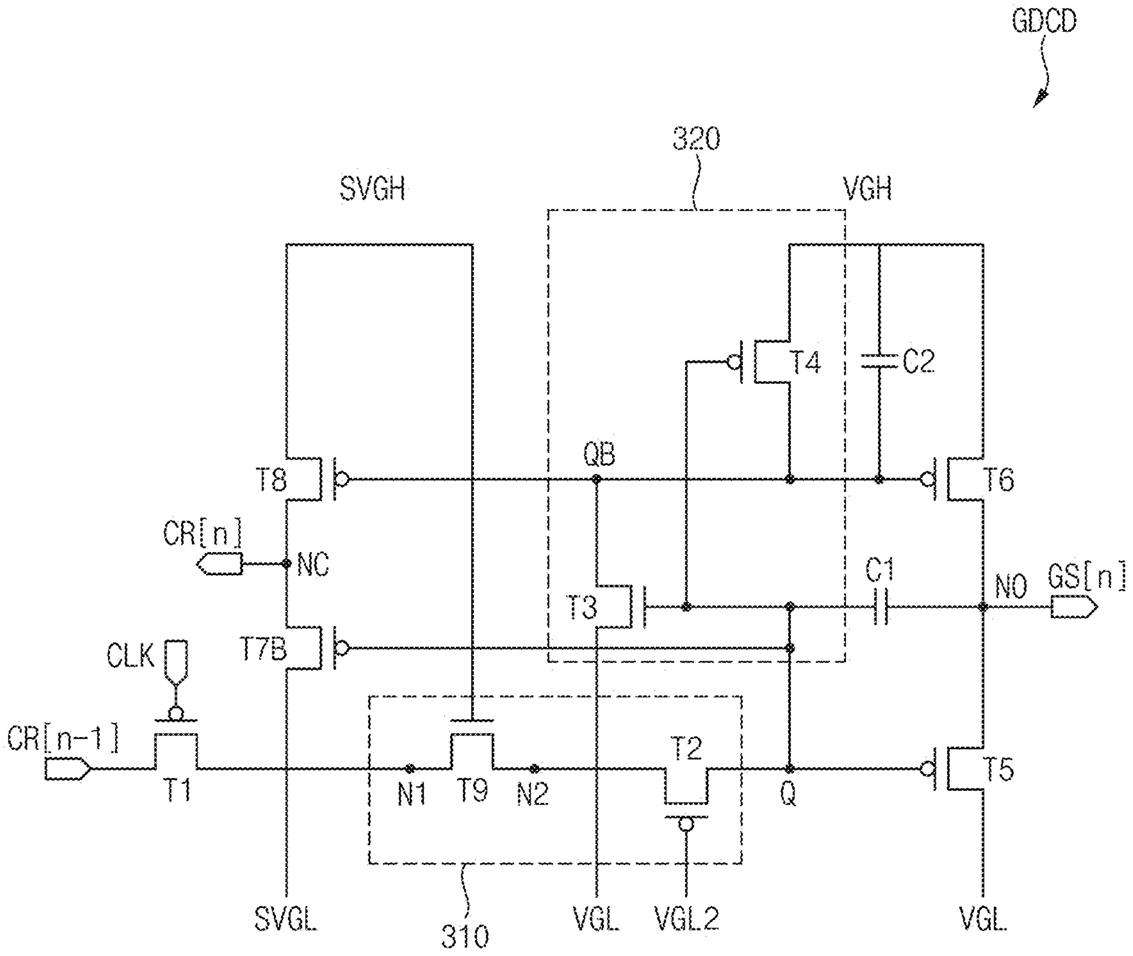
FIG. 8 is a circuit diagram illustrating a gate driving circuit included in a gate driver of FIG. 6.

FIG. 8 is a circuit diagram illustrating a gate driving circuit GDCD included in a gate driver 300B of FIG. 6.

Referring to FIG. 8, a gate driving circuit GDCD may include first to ninth transistor T1, T2, T3, T4, T5, T6, T7B, T8 and T9, a first capacitor C1 and a second capacitor C2.

The gate driving circuit GDCD according to a present embodiment is substantially the same as the gate driving circuit GDCB of FIG. 5 except that the second low voltage VGL2 may be applied to a control electrode of the second transistor T2. Accordingly, the same reference numerals will be used to refer to the same and any repetitive explanation concerning the above elements will be omitted.

Referring to FIG. 1, FIG. 4, FIG. 6 and FIG. 8, the second low voltage VGL2 may be applied to the control electrode of the second transistor T2. The first low voltage VGL and the second low voltage VGL2 may be different. A voltage of the pull-down control node Q may be controlled based on the second low voltage VGL2. For example, in the fourth period TP4A, a timing which the second transistor T2 is turned-off may be controlled based on a difference between the second low voltage VGL2 and a voltage of the second node N2.

When the second low voltage VGL2 is higher than the first low voltage VGL, the timing which the second transistor T2 may be faster. Since the timing which the second transistor T2 may be faster, a timing which the pull-down control node Q is floated may be faster. Accordingly, the bootstrapping voltage applied to the pull-down control node Q may be increased. Accordingly, the fifth transistor T5 may be turned-on more strongly. Additionally, since the timing which the pull-down control node Q is floated may be faster, a timing which the fourth transistor T4 is turned-on may be faster. Accordingly, a timing which the seventh transistor T7A is turned-on may be faster. Since the timing which the seventh transistor T7A is turned-on may be faster, a slew rate of the carry signal CR[n] may be effectively improved.

When the second low voltage VGL2 is lower than the first low voltage VGL, a timing which the second transistor T2 is turned-off may be delayed. Since the timing which the second transistor T2 is turned-off may be delayed, the timing which the pull-down control node Q is floated may be delayed. Accordingly, the bootstrapping voltage applied to the pull-down control node Q may be reduced. Accordingly, a stress applied to the fifth transistor T5 may be reduced.

Figure 9:
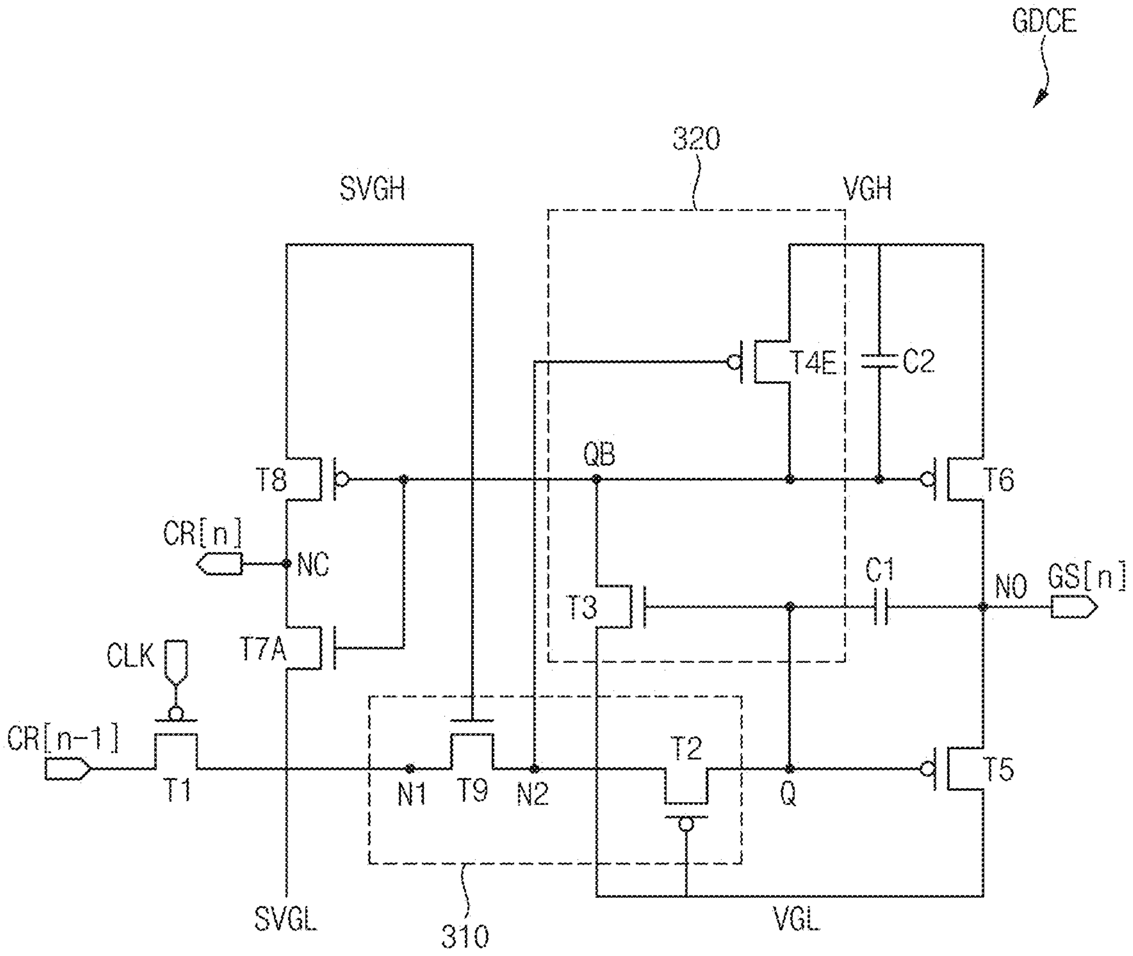
FIG. 9 is a circuit diagram illustrating a gate driving circuit included in a gate driver of FIG. 2.

FIG. 9 is a circuit diagram illustrating a gate driving circuit GDCE included in a gate driver 300A of FIG. 2.

Referring to FIG. 9, a gate driving circuit GDCE may include first to ninth transistor T1, T2, T3, T4E, T5, T6, T7A, T8 and T9, a first capacitor C1 and a second capacitor C2.

The gate driving circuit GDCE according to a present embodiment is substantially the same as the gate driving circuit GDCA of FIG. 3 except that the control electrode of the fourth transistor T4 is connected to the second node N2. Accordingly, the same reference numerals will be used to refer to the same and any repetitive explanation concerning the above elements will be omitted.

Figure 10:
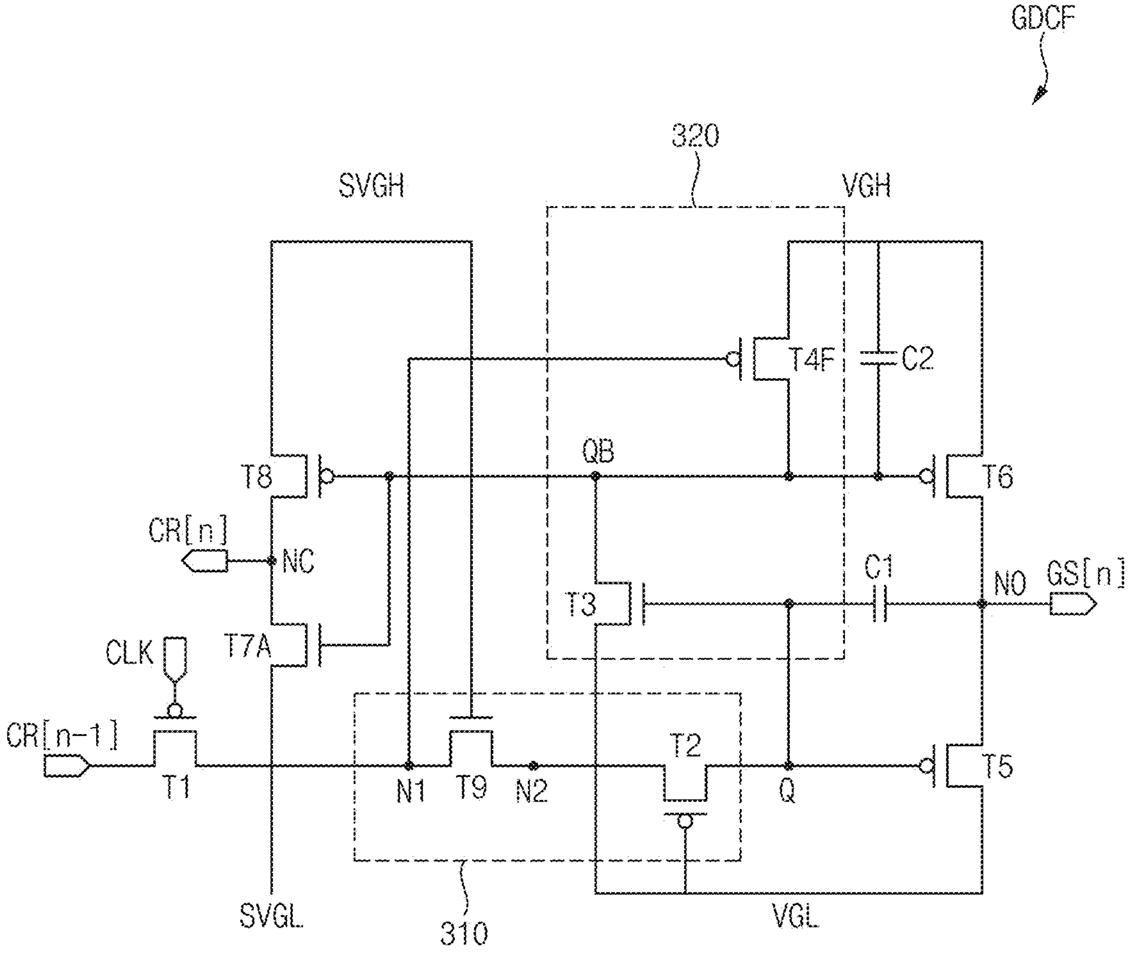
FIG. 10 is a circuit diagram illustrating a gate driving circuit included in a gate driver of FIG. 2.

FIG. 10 is a circuit diagram illustrating a gate driving circuit GDCF included in a gate driver 300A of FIG. 2.

Referring to FIG. 10, a gate driving circuit GDCE may include first to ninth transistor T1, T2, T3, T4F, T5, T6, T7A, T8 and T9, a first capacitor C1 and a second capacitor C2.

The gate driving circuit GDCE according to a present embodiment is substantially the same as the gate driving circuit GDCA of FIG. 3 except that the control electrode of the fourth transistor T4 is connected to the first node N2. Accordingly, the same reference numerals will be used to refer to the same and any repetitive explanation concerning the above elements will be omitted.

Figure 11:
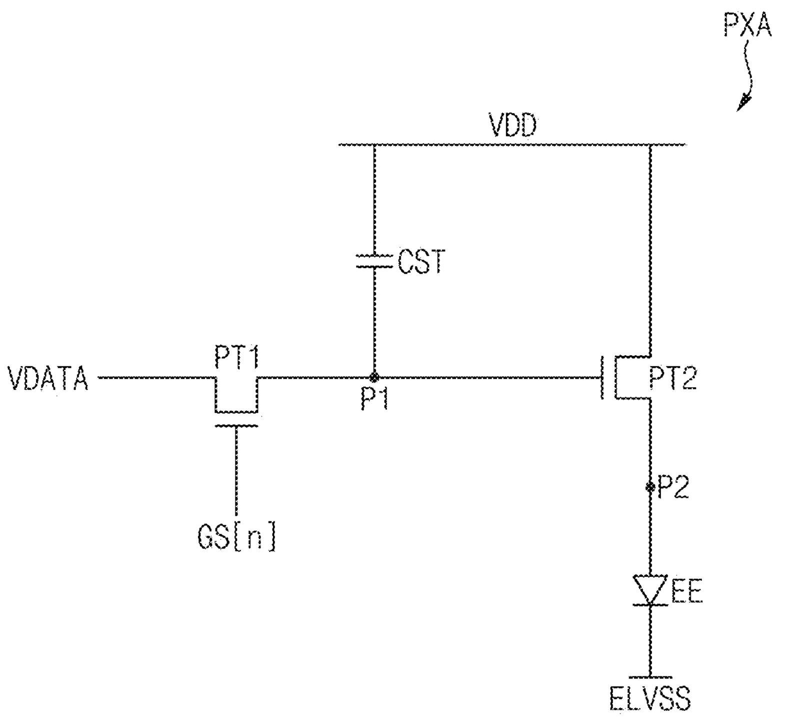
FIG. 11 is a diagram illustrating an example of a pixel circuit included in a display apparatus of FIG. 1.

FIG. 11 is a diagram illustrating an example of a pixel circuit PX included in a display apparatus 1 of FIG. 1.

Referring to FIG. 11, a pixel circuit PXA may include a first pixel transistor PT1, a second pixel transistor PT2, a storage capacitor CST and a light emitting element EE.

The first pixel transistor PT1 may include a control electrode for receiving the gate signal GS[n], a first electrode for receiving the data voltage VDATA and a second electrode connected to a first pixel node P1. The first pixel transistor PT1 may apply the data voltage VDATA to the first pixel node P1 in response to the gate signal GS[n]. For example, the first pixel transistor PT1 may be called as a "write transistor".

The second pixel transistor PT2 may include a control electrode connected to the first pixel node P1, a first electrode for receiving the first power voltage VDD and a second electrode connected to a second pixel node P2. The second pixel transistor PT2 may generate a driving current based on a voltage of the first pixel node P1. For example, the second pixel transistor PT2 may be called as a "driving transistor".

The storage capacitor CST may include a first electrode for receiving the first power voltage VDD and a second electrode connected to the first pixel node P1.

The light emitting element may include a first electrode connected to the second pixel node P2 and a second electrode for receiving the second power voltage VSS. The light emitting element EE may emit light based on the driving current.

Figure 12:
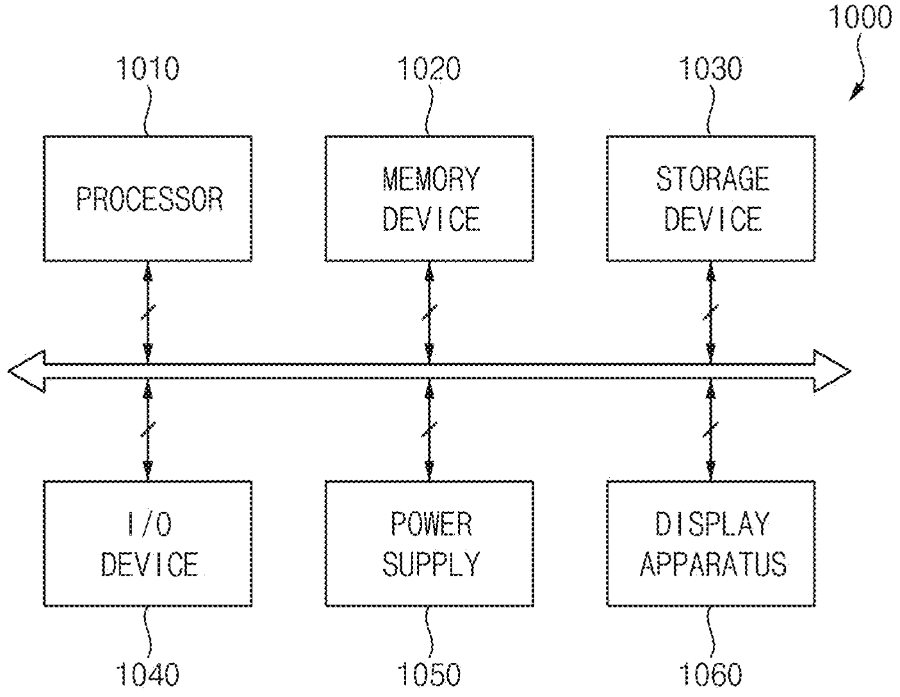
FIG. 12 is a block diagram illustrating an electronic apparatus according to an embodiment of the present invention.

FIG. 12 is a block diagram illustrating an electronic apparatus 1000 according to an embodiment of the present invention.

Referring to FIG. 12, the electronic apparatus 1000 may include a processor 1010, a memory device 1020, a storage device 1030, an input/output ("I/O") device 1040, a power supply 1050, and a display apparatus 1060. Here, the display apparatus 1060 may be the display apparatus 1 of FIG. 1. Additionally, the electronic apparatus 1000 may further include a plurality of ports for communicating with a video card, a sound card, a memory card, a universal serial bus ("USB") device, other electronic apparatus, etc.

For example, the electronic apparatus 1000 may be implemented as a cellular phone, a video phone, a smart pad, a smart watch, a tablet PC, a car navigation system, a computer monitor, a laptop, a head mounted display ("HMD") device, and the like.

The processor 1010 may perform various computing functions or various tasks. The processor 1010 may be a micro-processor, a central processing unit ("CPU"), an application processor ("AP"), and the like. The processor 1010 may be coupled to other components via an address bus, a control bus, a data bus, etc. Further, the processor 1010 may be coupled to an extended bus such as a peripheral component interconnection ("PCI") bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, and the like and/or at least one volatile memory device such as a dynamic random access memory ("DRAM") device, a static random access memory ("SRAM") device, a mobile DRAM device, and the like.

The storage device 1030 may include a solid state drive ("SSD") device, a hard disk drive ("HDD") device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

Figure 13:
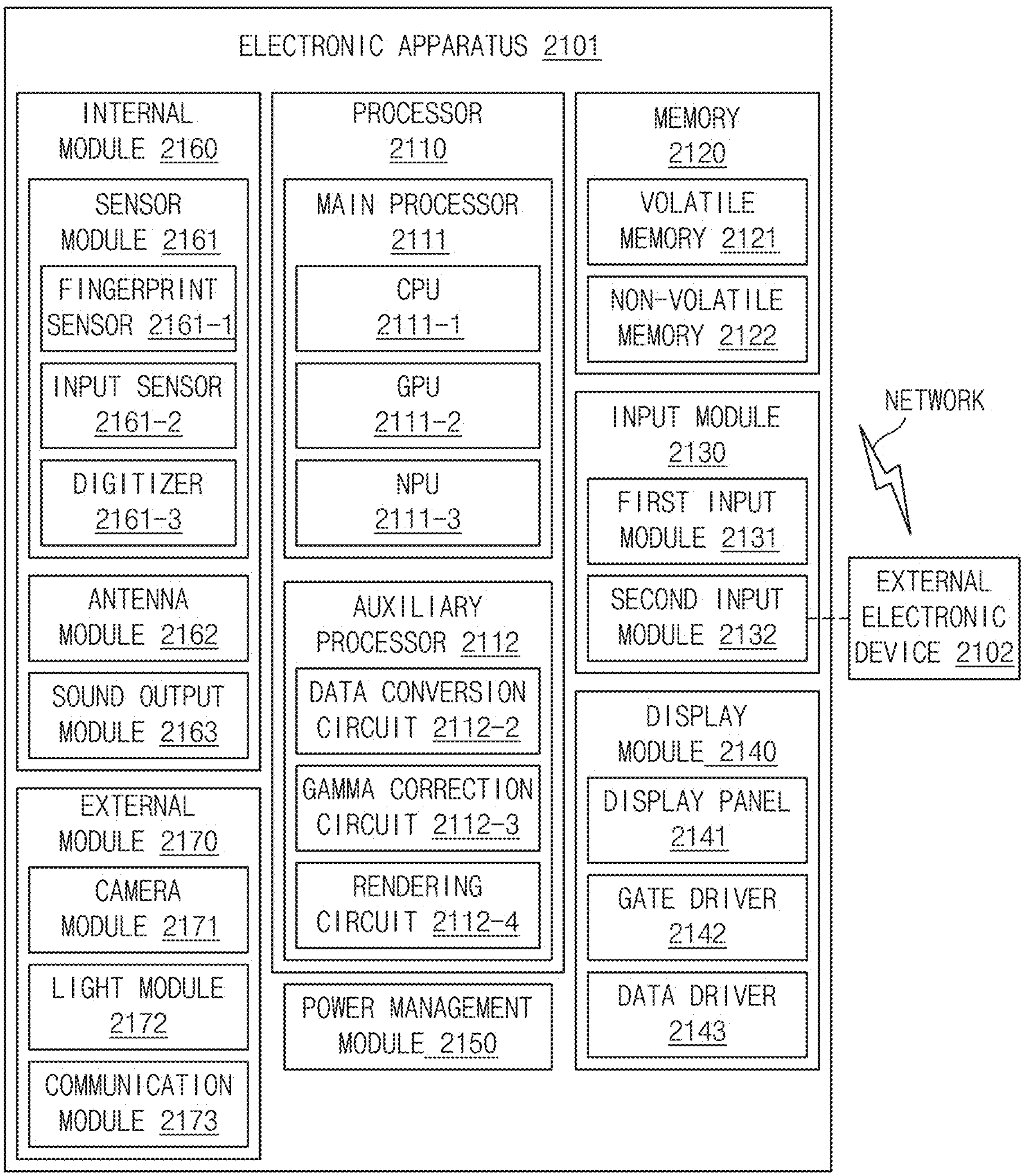
FIG. 13 is a block diagram illustrating an example of an electronic apparatus of FIG. 12.

FIG. 13 is a block diagram illustrating an example of an electronic apparatus of FIG. 12.

An electronic apparatus 2101 may output various information via a display module 2140 in an operating system. When a processor 2110 executes an application stored in a memory 2120, the display module 2140 may provide application information to a user via a display panel 2141.

The processor 2110 may obtain an external input via an input module 2130 or a sensor module 2161 and may execute an application corresponding to the external input. For example, when the user selects a camera icon displayed on the display panel 2141, the processor 2110 may obtain a user input via an input sensor 2161-2 and may activate a camera module 2171. The processor 2110 may transfer image data corresponding to an image captured by the camera module 2171 to the display module 2140. The display module 2140 may display an image corresponding to the captured image via the display panel 2141.

As another example, when personal information authentication is executed in the display module 2140, a fingerprint sensor 2161-1 may obtain input fingerprint information as input data. The processor 2110 may compare the input data obtained by the fingerprint sensor 2161-1 with authentication data stored in the memory 2120, and may execute an application according to the comparison result. The display module 2140 may display information executed according to application logic via the display panel 2141.

As another example, when a music streaming icon displayed on the display module 2140 is selected, the processor 2110 obtains a user input via the input sensor 2161-2 and may activate a music streaming application stored in the memory 2120. When a music execution command is input in the music streaming application, the processor 2110 may activate a sound output module 2163 to provide sound information corresponding to the music execution command to the user.

In the above, an operation of the electronic apparatus 2101 has been briefly described. Hereinafter, a configuration of the electronic apparatus 2101 will be described in detail. Some components of the electronic apparatus 2101 described below may be integrated and provided as one component or one component may be provided separately as two or more components.

Referring to FIG. 13, the electronic apparatus 2101 may communicate with an external electronic device 2102 via a network (e.g., a short-range wireless communication network or a long-range wireless communication network). In an embodiment, the electronic apparatus 2101 may include the processor 2110, the memory 2120, the input module 2130, the display module 2140, a power management module 2150, an internal module 2160 and an external module 2170. In an embodiment, at least one of the components may be omitted from the electronic apparatus 2101 or one or more other components may be added in the electronic apparatus 2101. In an embodiment, some of the components (e.g., the sensor module 2161, an antenna module 2162 or the sound output module 2163) may be implemented as a single component (e.g., the display module 2140).

The processor 2110 may execute software to control at least one other component (e.g., a hardware or software component) of the electronic apparatus 2101 coupled with the processor 2110 and may perform various data processing or computation. According to an embodiment, as at least part of the data processing or computation, the processor 2110 may store a command or data received from another component (e.g., the input module 2130, the sensor module 2161 or a communication module 2173) in volatile memory 2121, may process the command or the data stored in the volatile memory 2121 and may store resulting data in non-volatile memory 2122.

The processor 2110 may include a main processor 2111 and an auxiliary processor 2112. The main processor 2111 may include one or more of a central processing unit (CPU) 2111-1 or an application processor (AP). The main processor 2111 may further include any one or more of a graphics processing unit ("GPU") 2111-2, a communication processor ("CP") and an image signal processor ("ISP"). The main processor 2111 may further include a neural processing unit ("NPU") 2111-3. The NPU 2111-3 may be a processor specialized in processing an artificial intelligence model and the artificial intelligence model may be generated through machine learning. The artificial intelligence model may include a plurality of artificial neural network layers. The artificial neural network may be a deep neural network ("DNN"), a convolutional neural network ("CNN"), a recurrent neural network ("RNN"), a restricted Boltzmann machine ("RBM"), a deep belief network ("DBN"), a bidirectional recurrent deep neural network ("BRDNN"), deep Q-network or a combination of two or more thereof, but is not limited thereto. The artificial intelligence model may, additionally or alternatively, include a software structure other than a hardware structure. At least two of the above-described processing units and processors may be implemented as an integrated component (e.g., a single chip) or respective processing units and processors may be implemented as independent components (e.g., a plurality of chips).

The auxiliary processor 2112 may include a controller. The controller may include an interface conversion circuit and a timing control circuit. The controller may receive an image signal from the main processor 2111, may convert a data format of the image signal to meet interface specifications with the display module 2140 and may output image data. The controller may output various control signals for driving the display module 2140.

The auxiliary processor 2112 may further include a data conversion circuit 2112-2, a gamma correction circuit 2112-3, a rendering circuit 2112-4 or the like. The data conversion circuit 2112-2 may receive image data from the controller. The data conversion circuit 2112-2 may compensate for the image data such that an image is displayed with a desired luminance according to characteristics of the electronic apparatus 2101 or the user's setting or may convert the image data to reduce power consumption or to eliminate an afterimage. Since the gamma correction circuit 2112-3 may convert image data or a gamma reference voltage an image displayed on the electronic apparatus 2101 has desired gamma characteristics. The rendering circuit 2112-4 may receive image data from the controller and may render the image data in consideration of a pixel arrangement of the display panel 2141 in the electronic apparatus 2101. At least one of the data conversion circuit 2112-2, the gamma correction circuit 2112-3 and the rendering circuit 2112-4 may be integrated in another component (e.g., the main processor 2111 or the controller). At least one of the data conversion circuit 2112-2, the gamma correction circuit 2112-3 and the rendering circuit 2112-4 may be integrated in a data driver 2143 described below.

The memory 2120 may store various data used by at least one component (e.g., the processor 2110 or the sensor module 2161) of the electronic apparatus 2101. The various data may include, for example, input data or output data for a command related thereto. The memory 2120 may include at least one of the volatile memory 2121 and the non-volatile memory 2122.

The input module 2130 may receive a command or data to be used by the components (e.g., the processor 2110, the sensor module 2161 or the sound output module 2163) of the electronic apparatus 2101 from the outside of the electronic apparatus 2101 (e.g., the user or the external electronic device 2102).

The input module 2130 may include a first input module 2131 for receiving a command or data from the user and a second input module 2132 for receiving a command or data from the external electronic device 2102. The first input module 2131 may include a microphone, a mouse, a keyboard, a key (e.g., a button) or a pen (e.g., a passive pen or an active pen). The second input module 2132 may support a designated protocol capable of connecting the electronic apparatus 2101 to the external electronic device 2102 by wire or wirelessly. In an embodiment, the second input module 2132 may include a high definition multimedia interface ("HDMI"), a universal serial bus ("USB") interface, an SD card interface or an audio interface. The second input module 2132 may include a connector that may physically connect the electronic apparatus 2101 to the external electronic device 2102. For example, the second input module 2132 may include an HDMI connector, a USB connector, an SD card connector or an audio connector (e.g., a headphone connector).

The display module 2140 may visually provide information to the user. The display module 2140 may include the display panel 2141, a gate driver 2142 and the data driver 2143. The display module 2140 may further include a window, a chassis and a bracket for protecting the display panel 2141.

The display panel 2141 may include a liquid crystal display panel, an organic light emitting display panel or an inorganic light emitting display panel, but the type of the display panel 2141 is limited thereto. The display panel 2141 may be a rigid type display panel or a flexible type display panel capable of being rolled or folded. The display module 2140 may further include a supporter, a bracket or a heat dissipation member that supports the display panel 2141.

The gate driver 2142 may be mounted on the display panel 2141 as a driving chip. Alternatively, the gate driver 2142 may be integrated into the display panel 2141. For example, the gate driver 2142 may include an amorphous silicon TFT gate driver circuit ("ASG"), a low temperature polycrystalline silicon ("LTPS") TFT gate driver circuit or an oxide semiconductor TFT gate driver circuit ("OSG") embedded in the display panel 2141. The gate driver 2142 may receive a control signal from the controller and may output gate signals to the display panel 2141 in response to the control signal.

The display panel 2141 may further include an emission driver. The emission driver may output an emission control signal to the display panel 2141 in response to a control signal received from the controller. The emission driver may be formed separately from the gate driver 2142 or may be integrated into the gate driver 2142.

The data driver 2143 may receive a control signal from the controller, may convert image data into analog voltages (e.g., data voltages) in response to the control signal and then may output the data voltages to the display panel 2141.

The data driver 2143 may be incorporated into other components (e.g., the controller). Further, the functions of the interface conversion circuit and the timing control circuit of the controller described above may be integrated into the data driver 2143.

The display module 2140 may further include the emission driver, a voltage generator circuit or the like. The voltage generator circuit may output various voltages used to drive the display panel 2141.

The power management module 2150 may supply power to the components of the electronic apparatus 2101. The power management module 2150 may include a battery that charges a power supply voltage. The battery may include a primary cell which is not rechargeable, a secondary cell which is rechargeable or a fuel cell. The power management module 2150 may include a power management integrated circuit ("PMIC"). The PMIC may supply optimal power to each of the modules described above and modules described below. The power management module 2150 may include a wireless power transmission/reception member electrically connected to the battery. The wireless power transmission/reception member may include a plurality of antenna radiators in the form of coils.

The electronic apparatus 2101 may further include the internal module 2160 and the external module 2170. The internal module 2160 may include the sensor module 2161, the antenna module 2162 and the sound output module 2163. The external module 2170 may include the camera module 2171, a light module 2172 and the communication module 2173.

The sensor module 2161 may detect an input by the user's body or an input by the pen of the first input module 2131 and may generate an electrical signal or data value corresponding to the input. The sensor module 2161 may include at least one of the fingerprint sensor 2161-1, the input sensor 2161-2 and a digitizer 2161-3.

The fingerprint sensor 2161-1 may generate a data value corresponding to the user's fingerprint. The fingerprint sensor 2161-1 may include any one of an optical type fingerprint sensor and a capacitive type fingerprint sensor.

The input sensor 2161-2 may generate a data value corresponding to coordinate information of the user's body input or the pen input. The input sensor 2161-2 may convert a capacitance change caused by the input into the data value. The input sensor 2161-2 may detect the input by the passive pen or may transmit/receive data to/from the active pen.

The input sensor 2161-2 may measure a bio-signal, such as blood pressure, moisture or body fat. For example, when a portion of the body of the user touches a sensor layer or a sensing panel and does not move for a certain period of time, the input sensor 2161-2 may output information desired by the user to the display module 2140 by detecting the bio-signal based on a change in electric field due to the portion of the body.

The digitizer 2161-3 may generate a data value corresponding to coordinate information of the input by the pen. The digitizer 2161-3 may convert an amount of an electromagnetic change caused by the input into the data value. The digitizer 2161-3 may detect the input by the passive pen or may transmit/receive data to/from the active pen.

At least one of the fingerprint sensor 2161-1, the input sensor 2161-2 and the digitizer 2161-3 may be implemented as a sensor layer formed on the display panel 2141 through a continuous process. The fingerprint sensor 2161-1, the input sensor 2161-2 and the digitizer 2161-3 may be disposed above the display panel 2141 or at least one of the fingerprint sensor 2161-1, the input sensor 2161-2 and the digitizer 2161-3 may be disposed below the display panel 2141.

Two or more of the fingerprint sensor 2161-1, the input sensor 2161-2 and the digitizer 2161-3 may be integrated into one sensing panel through the same process. When integrated into one sensing panel, the sensing panel may be disposed between the display panel 2141 and a window disposed above the display panel 2141. In an embodiment, the sensing panel may be disposed on the window, but the location of the sensing panel is not limited thereto.

At least one of the fingerprint sensor 2161-1, the input sensor 2161-2 and the digitizer 2161-3 may be embedded in the display panel 2141. In other words, at least one of the fingerprint sensor 2161-1, the input sensor 2161-2 and the digitizer 2161-2 may be simultaneously formed through a process of forming elements (e.g., light emitting elements, transistors, etc.) included in the display panel 2141.

In addition, the sensor module 2161 may generate an electrical signal or a data value corresponding to an internal state or an external state of the electronic apparatus 2101. The sensor module 2161 may further include, for example, a gesture sensor, a gyro sensor, an atmospheric pressure sensor, a magnetic sensor, an acceleration sensor, a grip sensor, a proximity sensor, a color sensor, an infrared ("IR") sensor, a biometric sensor, a temperature sensor, a humidity sensor or an illuminance sensor.

The antenna module 2162 may include one or more antennas for transmitting or receiving a signal or power to or from the outside. In an embodiment, the communication module 2173 may transmit or receive a signal to or from the external electronic device 2102 through an antenna suitable for a communication method. An antenna pattern of the antenna module 2162 may be integrated into one component (e.g., the display panel 2141) of the display module 2140 or the input sensor 2161-2.

The sound output module 2163 may output sound signals to the outside of the electronic apparatus 2101. The sound output module 2163 may include, for example, a speaker or a receiver. The speaker may be used for general purposes, such as playing multimedia or playing record. The receiver may be used for receiving incoming calls. In an embodiment, the receiver may be implemented as separate from or as part of the speaker. A sound output pattern of the sound output module 2163 may be integrated into the display module 2140.

The camera module 2171 may capture a still image and a moving image. In an embodiment, the camera module 2171 may include one or more lenses, an image sensor or an image signal processor. The camera module 2171 may further include an infrared camera capable of measuring the presence or absence of the user, the user's location and the user's line of sight.

The light module 2172 may provide light. The light module 2172 may include a light emitting diode or a xenon lamp. The light module 2172 may operate in conjunction with the camera module 2171 or may operate independently of the camera module 2171.

The communication module 2173 may support establishing a wired or wireless communication channel between the electronic apparatus 2101 and the external electronic device 2102 and performing communication via the established communication channel. The communication module 2173 may include a wireless communication module (e.g., a cellular communication module, a short-range wireless communication module or a global navigation satellite system ("GNSS") communication module) or a wired communication module (e.g., a local area network ("LAN") communication module or a power line communication ("PLC") module). The communication module 2173 may communicate with the external electronic device 2102 via a short-range communication network (e.g., Bluetooth™, wireless-fidelity ("Wi-Fi") direct or infrared data association ("IrDA")) or a long-range communication network (e.g., a cellular network, the Internet or a computer network (e.g., LAN or wide area network ("WAN")). These various types of communication modules 2173 may be implemented as a single chip or may be implemented as multi-chips separate from each other.

The input module 2130, the sensor module 2161, the camera module 2171 and the like may be used to control an operation of the display module 2140 in conjunction with the processor 2110.

The processor 2110 may output a command or data to the display module 2140, the sound output module 2163, the camera module 2171 or the light module 2172 based on input data received from the input module 2130. For example, the processor 2110 may generate image data corresponding to input data applied through a mouse or an active pen and may output the image data to the display module 2140. Alternatively, the processor 2110 may generate command data corresponding to the input data and may output the command data to the camera module 2171 or the light module 2172. When no input data is received from the input module 2130 for a certain period of time, the processor 2110 may switch an operation mode of the electronic apparatus 2101 to a low power mode or a sleep mode, thereby reducing power consumption of the electronic apparatus 2101.

The processor 2110 may output a command or data to the display module 2140, the sound output module 2163, the camera module 2171 or the light module 2172 based on sensing data received from the sensor module 2161. For example, the processor 2110 may compare authentication data applied by the fingerprint sensor 2161-1 with authentication data stored in the memory 2120 and then may execute an application according to the comparison result. The processor 2110 may execute a command or output corresponding image data to the display module 2140 based on the sensing data sensed by the input sensor 2161-2 or the digitizer 2161-3. In a case where the sensor module 2161 includes a temperature sensor, the processor 2110 may receive temperature data from the sensor module 2161 and may further perform luminance correction on the image data based on the temperature data.

The processor 2110 may receive measurement data about the presence or absence of the user, the location of the user and the user's line of sight from the camera module 2171. The processor 2110 may further perform luminance correction on the image data based on the measurement data. For example, after the processor 2110 determines the presence or absence of the user based on the input from the camera module 2171, the data conversion circuit 2112-2 or the gamma correction circuit 2112-3 may perform the luminance correction on the image data and the processor 2110 may provide the luminance-corrected image data to the display module 2140.

At least some of the above-described components may be coupled mutually and communicate signals (e.g., commands or data) therebetween via an inter-peripheral communication scheme (e.g., a bus, general purpose input and output ("GPIO"), serial peripheral interface ("SPI"), mobile industry processor interface ("MIPI") or ultra-path interconnect ("UPI")). The processor 2110 may communicate with the display module 2140 via an agreed interface. Further, any one of the above-described communication methods may be used between the processor 2110 and the display module 2140, but the communication method between the processor 2110 and the display module 2140 is not limited to the above-described communication method.

The electronic apparatus 2101 according to various embodiments described above may be various types of devices. For example, the electronic apparatus 2101 may include at least one of a portable communication device (e.g., a smart phone), a computer device, a portable multimedia device, a portable medical device, a camera, a wearable device and a home appliance. However, the electronic apparatus 2101 according to embodiments is not limited to the above-described devices.

The display apparatus according to the embodiments may be applied to a display apparatus included in a computer, a notebook, a mobile phone, a smart phone, a smart pad, a PMP, a PDA, an MP3 player, or the like.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A display apparatus comprising:

a display panel including a pixel;

a gate driver configured to output a gate signal to the pixel; and a data driver configured to apply a data voltage to the pixel, wherein the gate driver includes:

an applying transistor configured to apply a previous carry signal to a transmitter in response to a clock signal;

the transmitter configured to apply the previous carry signal to a pull-down control node;

a pull-up controller connected to the transmitter and configured to control a pull-up control node;

a pull-down transistor configured to apply a low voltage to an output node in response to a voltage of the pull-down control node;

a pull-up transistor configured to apply a high voltage to the output node in response to a voltage of the pull-up control node;

a carry pull-down transistor configured to apply a carry low voltage to a carry node in response to the voltage of the pull-up control node; and a carry pull-up transistor configured to apply a carry high voltage to the carry node in response to the voltage of the pull-up control node, and wherein the carry low voltage is higher than the low voltage.

2. The display apparatus of claim 1, wherein the carry pull-down transistor is an N-type transistor and the carry pull-up transistor is a P-type transistor.

3. The display apparatus of claim 1, wherein the transmitter includes:

a first transmit transistor configured to connect a first node and a second node; and a second transmit transistor configured to connect the second node and the pull-down control node.

4. The display apparatus of claim 3, wherein the first transmit transistor includes a control electrode for receiving the carry high voltage, a first electrode connected to the first node and a second electrode connected to the second node.

5. The display apparatus of claim 4, wherein the second transmit transistor includes a control electrode for receiving the low voltage, a first electrode connected to the second node and a second electrode connected to the pull-down control node.

6. The display apparatus of claim 3, wherein the first transmit transistor is an N-type transistor.

7. The display apparatus of claim 3, wherein the second transmit transistor includes a control electrode for receiving the low voltage, a first electrode connected to the second node and a second electrode connected to the pull-down control node.

8. The display apparatus of claim 1, wherein the pull-up controller includes:

a first pull-up control transistor including a control electrode connected to the pull-down control node, a first electrode for receiving the low voltage and a second electrode connected to the pull-up control node; and a second pull-up control transistor including a control electrode connected to the pull-down control node, a first electrode for receiving the high voltage and a second electrode connected to the pull-up control node.

9. The display apparatus of claim 1, wherein a difference between the low voltage and the carry low voltage is higher than an absolute value of a threshold voltage of the carry pull-down transistor.

10. The display apparatus of claim 1, wherein the gate driver includes:

a first transistor including a control electrode for receiving the clock signal, a first electrode for receiving the previous carry signal and a second electrode connected a first node;

a second transistor including a control electrode for receiving the low voltage, a first electrode connected to a second node and a second electrode connected to the pull-down control node;

a third transistor including a control electrode connected to the pull-down control node, a first electrode for receiving the low voltage and a second electrode connected to the pull-up control node;

a fourth transistor including a control electrode connected to the pull-down control node, a first electrode for receiving the high voltage and a second electrode connected to the pull-up control node;

a fifth transistor including a control electrode connected to the pull-down control node, a first electrode for receiving the low voltage and a second electrode connected to the output node;

a sixth transistor including a control electrode connected to the pull-up control node, a first electrode for receiving the high voltage and a second electrode connected to the output node;

a seventh transistor including a control electrode connected to the pull-up control node, a first electrode for receiving the carry low voltage and a second electrode connected to the carry node;

an eighth transistor including a control electrode connected to the pull-up control node, a first electrode for receiving the carry high voltage and a second electrode connected to the carry node; and a ninth transistor including a control electrode for receiving the carry high voltage, a first electrode connected to the first node and a second electrode connected to the second node, and wherein the first transistor is the applying transistor, the fifth transistor is the pull-down transistor, the sixth transistor is the pull-up transistor, the seventh transistor is the carry pull-down transistor, and the eighth transistor is the carry pull-up transistor.

11. A display apparatus comprising:

a display panel including a pixel;

a gate driver configured to output a gate signal to the pixel; and a data driver configured to apply a data voltage to the pixel, wherein the gate driver includes:

an applying transistor configured to apply a previous carry signal to a transmitter in response to a clock signal;

the transmitter configured to apply the previous carry signal to the pull-down control node;

a pull-up controller connected to the transmitter and configured to control a pull-up control node;

a pull-down transistor configured to apply a first low voltage to an output node in response to a voltage of the pull-down control node;

a pull-up transistor configured to apply a high voltage to the output node in response to a voltage of the pull-up control node;

a carry pull-down transistor configured to apply a carry low voltage to a carry node in response to the voltage of the pull-down control node; and a carry pull-up transistor configured to apply a carry high voltage to the carry node in response to the voltage of the pull-up control node, and wherein the carry low voltage is higher than the first low voltage.

12. The display apparatus of claim 11, wherein the carry pull-down transistor is a P-type transistor.

13. The display apparatus of claim 11, wherein the transmitter includes:

a first transmit transistor configured to connect a first node and a second node; and a second transmit transistor configured to connect the second node and the pull-down control node.

14. The display apparatus of claim 13, wherein the first transmit transistor includes a control electrode for receiving the carry high voltage, a first electrode connected to the first node and a second electrode connected to the second node.

15. The display apparatus of claim 13, wherein the first transmit transistor is an N-type transistor.

16. The display apparatus of claim 13, wherein the second transmit transistor includes a control electrode for receiving a second low voltage different from the first low voltage, a first electrode connected to the second node and a second electrode connected to the pull-down control node.

17. The display apparatus of claim 11, wherein a difference between the first low voltage and the carry low voltage is higher than an absolute value of a threshold voltage of the carry pull-down transistor.

18. An electronic apparatus comprising:

a display panel including a pixel;

a gate driver configured to output a gate signal to the pixel;

a data driver configured to apply a data voltage to the pixel;

a driving controller configured to control the gate driver and the data driver; and a processor configured to output input image data and input control signal, wherein the gate driver includes:

an applying transistor configured to apply a previous carry signal to a transmitter in response to a clock signal;

the transmitter configured to apply the previous carry signal to a pull-down control node;

a pull-up controller connected to the transmitter and configured to control a pull-up control node;

a pull-down transistor configured to apply a low voltage to an output node in response to a voltage of the pull-down control node;

a pull-up transistor configured to apply a high voltage to the output node in response to a voltage of the pull-up control node;

a carry pull-down transistor configured to apply a carry low voltage to a carry node in response to the voltage of the pull-up control node; and a carry pull-up transistor configured to apply a carry high voltage to the carry node in response to the voltage of the pull-up control node, and wherein the carry low voltage is higher than the low voltage.

19. The electronic apparatus of claim 18, wherein the carry pull-down transistor is an N-type transistor and the carry pull-up transistor is a P-type transistor.

20. The electronic apparatus of claim 18, wherein a difference between the first low voltage and the carry low voltage is higher than an absolute value of a threshold voltage of the carry pull-down transistor.

* * * * *